US007648091B2

(12) United States Patent
Umeda et al.

(10) Patent No.: US 7,648,091 B2
(45) Date of Patent: Jan. 19, 2010

(54) MOBILE WOOD CRUSHER

(75) Inventors: Hiroyuki Umeda, Hirakata (JP); Noriyuki Yoshida, Hirakata (JP)

(73) Assignee: Komatsu Ltd., Tokyo (JP)

( * ) Notice: Subject to any disclaimer, the term of this patent is extended or adjusted under 35 U.S.C. 154(b) by 641 days.

(21) Appl. No.: 10/541,709

(22) PCT Filed: Sep. 16, 2004

(86) PCT No.: PCT/JP2004/013513

§ 371 (c)(1),
(2), (4) Date: Jul. 8, 2005

(87) PCT Pub. No.: WO2005/028117

PCT Pub. Date: Mar. 31, 2005

(65) Prior Publication Data

US 2006/0113412 A1 Jun. 1, 2006

(30) Foreign Application Priority Data

Sep. 18, 2003 (JP) ............................. 2003-326496
Oct. 22, 2003 (JP) ............................. 2003-361348
Oct. 29, 2003 (JP) ............................. 2003-369574

(51) Int. Cl.
*B02B 5/02* (2006.01)
*A01D 34/00* (2006.01)
*B02C 9/04* (2006.01)
*B03B 7/00* (2006.01)

(52) U.S. Cl. ............................... 241/101.74; 241/285.3

(58) Field of Classification Search ............. 241/285.3, 241/101.74, 605
See application file for complete search history.

(56) References Cited

U.S. PATENT DOCUMENTS 4,997,135 A 3/1991 Zehr (Continued)

FOREIGN PATENT DOCUMENTS

JP 2000-015128 A 1/2000

(Continued)

OTHER PUBLICATIONS

A Japanese Office Action (and English translation thereof) dated May 7, 2008, issued in a counterpart Japanese Application.

*Primary Examiner*—Bena Miller
(74) *Attorney, Agent, or Firm*—Frishauf, Holtz, Goodman & Chick, P.C.

(57) ABSTRACT

A movable wood crushing machine according to the present invention comprises a vehicle body 2 with a travel device provided therein; a rotary crushing device 6 provided at an edge of this vehicle body in the traveling direction for crushing the wood into wood chips; a tab-type feeder 7 provided on this rotary crushing device with an charging opening for charging wood to be crushed formed in an upper section thereof; a conveyer 4 extending from a position under the rotary crushing device 6 in the traveling direction of the vehicle body toward the other edge section of the vehicle body in the traveling direction for transferring and discharging wood chips crushed by the rotary crushing device 6 to the outside; and a drive unit 5 provided between the rotary crushing device 6 and the conveyer 4 for driving drive sources for the travel device 3, the rotary crushing device 6, the tab-type feeder 7, and the conveyer 4.

23 Claims, 38 Drawing Sheets

U.S. PATENT DOCUMENTS

| | | | | |
|---|---|---|---|---|
| 5,580,004 | A * | 12/1996 | Tamura et al. | 241/36 |
| 5,803,376 | A * | 9/1998 | Koyanagi et al. | 241/36 |
| 6,745,965 | B1 * | 6/2004 | Onoda et al. | 241/101.761 |
| 2004/0200914 | A1 * | 10/2004 | Hishiyama et al. | 241/101.74 |

FOREIGN PATENT DOCUMENTS

| | | | |
|---|---|---|---|
| JP | 2001-9318 | A | 1/2001 |
| JP | 2002-192959 | A | 7/2002 |
| JP | 2002-194769 | A | 7/2002 |
| JP | 2002-346425 | A | 12/2002 |
| JP | 2003-170075 | A | 6/2003 |
| JP | 2003-190833 | A | 7/2003 |
| JP | 2003-205250 | A | 7/2003 |

* cited by examiner

MOBILE WOOD CRUSHER

This application is a U.S. National Phase Application under 35 USC 371 of International Application PCT/JP2004/013513 filed Sep. 16, 2004.

TECHNICAL FIELD

The present invention relates to a movable wood crushing machine for crushing charged wood to produce chip-like crushed pieces of wood.

BACKGROUND ART

For the purpose to recycle trees or tree branches felled from forests as fertilizers for organic farming and the like, or for suppressing a transportation cost by reducing a transport capacity when waste wood from deserted or broken houses is transported with an auto truck, a wood crushing machine capable of crushing the trees and waste woods into chips is often used.

As a movable wood crushing machine based on the conventional technology, for instance, that described in Patent Document 1 is well known.

A movable wood crushing machine 100 based on the conventional technology as described above comprises, for instance, a vehicle body 110, a crawler type travel device 120, an engine 130, a hydraulic motor 140, a tab-type feeder 150, and a conveyer 160 as a carrying device.

Further, as shown in FIG. 40, a rotary crushing device 170 is provided just under the tab-type feeder 150. Further a scattering prevention cover 180 is provided above the tab-type feeder 150.

The vehicle body 110 comprises a steel-made frame supporting the engine 130, hydraulic motor 140, tab-type feeder 150, conveyer 160 and rotary crushing device 170, and the crawler type travel devices 120 are provided at both edges of the lower part of vehicle body 110 respectively, and when the crawler type travel devices 120 are driven, the vehicle body 110 runs.

The engine 130 is positioned at an edge section of the vehicle body 110 in the traveling direction, and a cooling fan 131 and a radiator 132 are provided at positions adjacent to the engine 130 in a direction perpendicular to the traveling direction, and an outer side of the radiator 132 is covered with a net 133.

In the side opposite to the cooling fan 131 and radiator 132, a hydraulic pump 134 is provided at a position adjacent to the engine 130, and this hydraulic pump 134 is connected via an oil-feeding pipe 135 to the hydraulic motor 140.

Provided on a side face of the vehicle body 110 with the hydraulic pump 134 is an operation panel 136 for controlling the engine 130, hydraulic pump 134, hydraulic motor 140 and the like.

A plurality of hydraulic motors 140 (not shown in FIG. 40) are provided in accordance with driven sections of the movable wood crushing machine 100 in addition to that connected to a rotary crushing device 170, and more specifically, in addition to that for the rotary crushing device 170 shown in FIG. 40, the hydraulic motors 140 are provided for the crawler type travel device 120, tab-type feeder 150, and conveyer 160 respectively.

The tab-type feeder 150 is provided at a substantially central portion of the vehicle body 110, and comprises a base plate 151 provided on the vehicle body 110, and a cylindrical body 152 rotatably provided on this base plate 151. At a position corresponding to the e rotary crushing device 170, an opening 153 is formed on the base plate 151, and when the cylindrical body 152 rotates in the direction as indicated by the arrow in FIG. 40, charged wood is guided to the opening 153 being agitated.

The conveyer 160 is provided in the contrary side from the engine 130 with the tab-type feeder 150 sandwiched therebetween, and an edge section thereof extends downward from the rotary crushing device 170. This conveyer 160 transfers the wood chips crushed by rotary crushing device 170 along the direction in which the movable wood crushing machine 100 travels to discharge the wood chips to the outside.

The rotary crushing device 170 comprises a rotary shaft connected to the hydraulic motor 140, a rotary drum provided around this rotary shaft and rotating in association with rotation of the rotary shaft, and a plurality of bits embedded on an external peripheral surface of the rotary drum, and when the rotary shaft is rotated by the hydraulic motor 140, the rotary drum rotates in the direction indicated by the arrow in FIG. 40. A screen is provided between this rotary crushing device 170 and the conveyer 160.

When wood chips is produced from wood with the movable wood crushing machine 100 as described above, at first, in the state where the tab-type feeder 150, conveyer 160, and rotary crushing device 170 are being rotated, wood is charged by a loader PC or the like into the rotary crushing device 170. The charged wood is rotated inside the tab-type feeder 150 and guided to the opening 153 to be crushed by the rotary crushing device 170.

When the wood chips are crushed by the rotary crushing device 170 to those each having a prespecified size or below, the wood chips are dropped via the screen onto the conveyer 160, and are discharged by the conveyer 160 to the outside.

When wood is crushed by the movable wood crushing machine 100 based on the conventional technology as described above, the rotary crushing device 170 must be cleaned periodically.

In this case, cleaning is performed after operations of the movable wood crushing machine 100 are stopped, but cleaning is difficult unless the tab-type feeder 150 is removed.

To solve this problem, as shown in FIG. 41, a swinging mechanism 190 for swinging the tab-type feeder 150 by 90 degrees in the lateral direction (in the direction perpendicular to the traveling direction) of the vehicle body 110 is provided under the tab-type feeder 150 mounted on the vehicle body 110 with the crawler type travel device 120 provided thereon (Refer to, for instance, Patent Document 2).

This swinging mechanism 190 comprises a coupling shaft 191 for pivotably supporting the tab-type feeder 150 on the vehicle body 110 and a hydraulic cylinder 192.

The hydraulic cylinder 192 is a member for coupling the vehicle body 110 to the base plate 151, and when the tab-type feeder 150 is swung by 90 degrees, this hydraulic cylinder 192 extends.

A hydraulic cylinder 193 is a member for coupling the tab-type feeder 150 and scattering prevention cover 180 to each other, and when wood is crushed, the hydraulic cylinder 193 extends so that an upper opening of the tab-type feeder 150 is covered with the scattering prevention cover 180, and during the swinging operation, the hydraulic cylinder 193 shrinks with the scattering prevention cover 180 positioned along a side face of the tab-type feeder 150, so that the scattering prevention cover 180 does not spring out in the lateral direction in the swinging posture.

Patent Document 1

Japanese Patent Laid-Open Publication No. 2001-9318 (page 4, FIG. 1)

Patent Document 2

Japanese Patent Laid-Open Publication No. 2000-15128 (page 4, page 5, FIG. 1, FIG. 7)

DISCLOSURE OF THE INVENTION

Problems to be Solved by the Invention

With the movable wood crushing machine 100 based on the conventional technology as described above, however, there occur the following problems.

(1) As the conveyer 160 is provided at a position adjacent to the tab-type feeder 150 and rotary crushing device 170 each provided at a central portion of the vehicle body 110, chipped wood pieces crushed by the rotary crushing device 170 scatter from the tab-type feeder 150 and sometimes are mixed through the screen in wood chips each having a desired size being carried onto the conveyer 160, which makes it difficult to uniform a size of produced wood chips.

(2) As shown in FIG. 40, when wood is charged by a loader PC into the tab-type feeder 150, usually the loader PC is positioned at a position other than that in the direction indicated by the white arrow mark in FIG. 40 in which crushed wood chips spatter. However, an operator of the loader PC can visually check a charging opening of the tab-type feeder 150 and various monitor display sections on an operation panel 136 from the position of the loader PC, but can not visually check a net 133 covering the radiator 132 and the like because the components are provided in the contrary side from the loader PC. Due to the characteristics of the movable wood crushing machine 100, sometimes fine wood waste is absorbed by the cooling fan 131 and deposited on the net 133, which may in turn cause over heating, and therefore the operator is required to visually check clogging of the net 133 during the work. For visually check clogging of the net 133, the operator must get off from the loader PC and goes to the contrary side for checking, which disadvantageously lowers the operator's work efficiency.

(3) The tab-type feeder 150 of the movable wood crushing machine 100 is positioned at a substantially central portion of the vehicle body 110 between the engine 130 and the conveyer 160, and therefore when the tab-type feeder 150 is swung for cleaning, wood pieces in the tab-type feeder 150 overflow to the outside, and the wood pieces hamper the cleaning work. So cleaning is performed after the movable wood crushing machine 100 is removed, but when the movable wood crushing machine 100 is removed in the state where the tab-type feeder 150 is being swung, as the tab-type feeder 150 is supported only with the hydraulic cylinder 192, the force generated by swinging is required to be coped with the coupling shaft 191 during travel, which may give damages to the coupling shaft.

It is an object of the present invention to provide a movable wood crushing machine enabling production of wood chips with uniform size, easy visual check of the operating state of the movable crushing machine during the work with a loader, and efficient cleaning work without applying any additional work loaded to the machine during the cleaning work.

Means for Solving the Problems

In the present invention, the object described above is achieved by changing the array of a rotary crushing device, a tab-type feeder, a conveyer, and a drive unit of a movable wood crushing machine.

Specifically, the movable wood crushing machine according to claim 1 for the present invention is a movable wood crushing machine for producing wood chips by crushing wood charged therein and comprises: a vehicle body provided with a travel device for traveling; a rotary crushing device provided at one edge of this vehicle body in the traveling direction for crushing the wood into wood chips; a tab-type feeder having a rotary tab rotatably provided on this rotary crushing device with an charging opening for charging wood to be crushed formed in upper part thereof; a conveyer extending from a position under the rotary crushing device toward the other edge of the vehicle body in the traveling direction for transferring and discharging wood chips crushed by the rotary crushing device to the outside; and a drive unit provided between the rotary crushing device and the conveyer for driving drive sources for the travel device, the rotary crushing device, the tab-type feeder, and the conveyer.

The movable wood crushing machine according to claim 2 for the present invention is characterized in that, in the movable wood crushing machine according to claim 1, the rotary crushing device is provided at a position adjacent to the drive unit; and the tab-type feeder has a scattering prevention cover provided at a position corresponding to the position of the rotary crushing device for covering the charging opening.

The movable wood crushing machine according to claim 3 for the present invention is characterized in that, in the movable wood crushing machine according to claim 2, an opening for feeding wood to the rotary crushing device is formed at a bottom section of the tab-type feeder; and the scattering prevention cover is provided at a position covering the opening when viewed from the top.

The movable wood crushing machined according to claim 4 for the present invention is characterized in that, in the movable wood crushing machine according to claim 2 or claim 3, the scattering prevention cover extends from an edge section of a the charging opening of the tab-type feeder on the side closer to the drive unit in the traveling direction toward an edge section in the lateral direction perpendicular to the traveling direction.

The movable wood crushing machine according to claim 5 for the present invention is characterized in that, in the movable wood crushing machine according to any of claims 1 to 4, an operation panel for driving and operating various devices including the drive unit is provided on a side face in the lateral direction perpendicular to the traveling direction of the vehicle body; a cooling air inlet section for the drive unit is formed on the side face with the operation panel provided thereon; and this cooling air inlet section is covered with a covering device allowing visual check of clogging on the surface thereof.

The movable wood crushing machine according to claim 6 for the present invention is characterized in that, in the movable wood crushing machine according to any of claims 1 to 5, the vehicle body is provided with a swinging mechanism for swinging the tab-type feeder toward edge sections in the traveling direction of the vehicle body.

The movable wood crushing machine according to claim 7 for the present invention is characterized in that, in the movable wood crushing machine according to claim 6, the swinging mechanism has a coupling shaft swingablly bearing the tab-type feeder on the vehicle body; and when the tab-type feeder is in a posture for working, the horizontal distance from the center of the coupling shaft to an edge section of the tab-type feeder on the side closer to the drive unit along the traveling direction of the vehicle body is shorter than the vertical distance from the center of the coupling shaft to the final (translator's comment: "final" was a scribal error for "highest") part of the tab-type feeder.

The movable wood crushing machine according to claim 8 for the present invention is characterized in that, in the movable wood crushing machine according to claim 7, when the tab-type feeder is in a posture for working, the horizontal distance from the center of the coupling shaft to an edge section of the tab-type feeder on the contrary side from the drive unit along the traveling direction of the vehicle body is shorter than the vertical direction from the center of the coupling shaft to a position of the travel device contacting the ground surface.

The movable wood crushing machine according to claim 9 for the present invention is characterized in that, in the movable wood crushing machine according to any of claims 5 to 7, the tab-type feeder comprises: a base plate fixed on the vehicle body; a rotary tab rotatably provided on this base plate; and a hopper provided in the upper part of the rotary tab and supported by a column erected from the base plate.

The movable wood crushing machine according to claim 10 for the present invention is characterized in that, in the movable wood crushing machine according to any of claims 6 to 9, the swinging mechanism has a swinging restricting section for inhibiting a swinging movement of the tab-type feeder up to a position causing interference to the travel device when the tab-type feeder is rotated swung the coupling shaft.

The wood crushing machine according to claim 11 for the present invention is characterized in that, in the movable wood crushing machine according to any of claims 1 to 10, a screen member allowing passing through only the wood chips crushed by the rotary crushing device having a prespecified size or below is provided between the rotary crushing device and the conveyer; and this screen member is provided around a rotary shaft of the rotary crushing device to surround the rotary crushing device with an upper edge thereof provided at a position higher than the rotary shaft of the rotary crushing device when viewed from a position of the rotary shaft.

Effect of the Invention

With the movable wood crushing machine according to claim 1, a drive unit is provided between the rotary crushing device and tab-type feeder and the conveyer, even if wood chips scatter from a charging opening of the tab-type feeder for charging wood, the scattered wood chips are never mixed with those on the conveyer, so that wood chips each with a uniform size can be produced.

Further, the rotary crushing device and tab-type feeder are provided in one side of the vehicle body, so that charging wood with a loader can be carried out from an edge section of the movable wood crushing machine in the traveling direction or from a side face section in the lateral direction, so that a position for charging wood can be changed according to the situation at the site, which ensures substantial improvement in the work efficiency.

Further the drive unit is provided at a substantially central position, and the rotary crushing device, tab-type feeder, and conveyer are provided around the drive unit, so that a transfer path of a driving force to drive sources for these devices from the drive unit can be shortened, so that delivery of a driving force can be carried out efficiently.

With the movable wood crushing machine according to claim 2, a scattering prevention cover is provided at a position corresponding to a position of the rotary crushing device, so that, even when wood pieces not having been crushed scatter from the charging opening for charging wood, the wood pieces are prevented from being scattered to the outside with this scattering prevention cover.

With the movable wood crushing machine according to claim 3, the scattering prevention cover is provided at a position covering an opening of the tab-type feeder for feeding wood when viewed from the top, so that wood pieces not having been crushed are prevented from being scattered to the outside more securely.

With the movable wood crushing machine according to claim 4, the scattering prevention cover extends from an edge section of the charging opening of the tab-type feeder on the side closer to the drive unit along the traveling direction toward an edge section in the lateral direction perpendicular to the traveling direction, so that the scattering prevention cover does not cause any trouble for charging wood with a loader from a side face or in the traveling direction, and therefore the work efficiency in wood charging is not spoiled and the effect of scattering prevention can be obtained.

With the movable wood crushing machine according to claim 5, the operation panel for operations of the drive unit and the like and the cooling air inlet section are provided in the same side of the movable wood crushing machine, and the cooling air inlet section is covered with a covering unit allowing visual check of clogging on the surface, so that, when performing the work for charging wood from this side, an operator can perform it visually checking the state of the operation panel or the cooling air inlet section, and therefore the work efficiency is not lowered by the need for checking and the like.

With the movable wood crushing machine according to claim 6, as the swinging mechanism is provided on the vehicle body and the tab-type feeder can be swung toward edge sections in the traveling direction of the vehicle body, so that the cleaning work for the rotary crushing device can be performed from either side of the movable wood crushing machine, and therefore the cleaning work can easily be performed. Further when wood inside the tab-type feeder is discharged to the outside during the swinging operation, scattering of wood to the side faces in the lateral direction never occurs, and therefore the cleaning work can be performed without the need of removing the movable wood crushing machine.

With the movable wood crushing machine according to claim 7, by swinging the tab-type feeder at a position of the coupling shaft as described above, when the tab-type feeder is swung and set in the vertical posture, the upper part can be positioned at a lower level as compared to the height of the tab-type feeder in the working posture, and therefore when the movable wood crushing machine is transported with a trailer or the like, by swinging and setting the tab-type feeder in the vertical posture, advantageous conditions are provided for restrictions over transportation with a trailer or the like.

With the movable wood crushing machine according to claim 8, by swinging the tab-type feeder at a position of the coupling shaft as described above, when the tab-type feeder is swung and set in the vertical posture, interference between the tab-type feeder and the ground surface can be prevented, and therefore movement with the traveling device is possible even in the state.

With the movable wood crushing machine according to claim 9, the hopper is fixed on the base plate, and the rotary tab under the hopper rotates, so that wood can be charged with a loader into the fixed hopper, so that the work efficiency in charging wood is improved.

With the movable wood crushing machine according to claim 10, the swinging mechanism has a swinging restricting section, so that interference to the traveling device never occurs even when the tab-type feeder is set in the vertical posture, and therefore the movable wood crushing machine can be moved with the tab-type feeder kept in the vertical posture, so that handling of the movable wood crushing machine can make easier.

With the movable wood crushing machine according to claim 11, the screen member is positioned above and covers the rotary shaft of the rotary crushing device, so that wood pieces not having been crushed never drop from an upper edge of the screen, nor are mixed in the crushed wood pieces having passed through the screen member, so that size of wood chips is uniformed and a quality of wood chips as a product can further be improved.

EXPLANATION OF CODES

Figure 1:
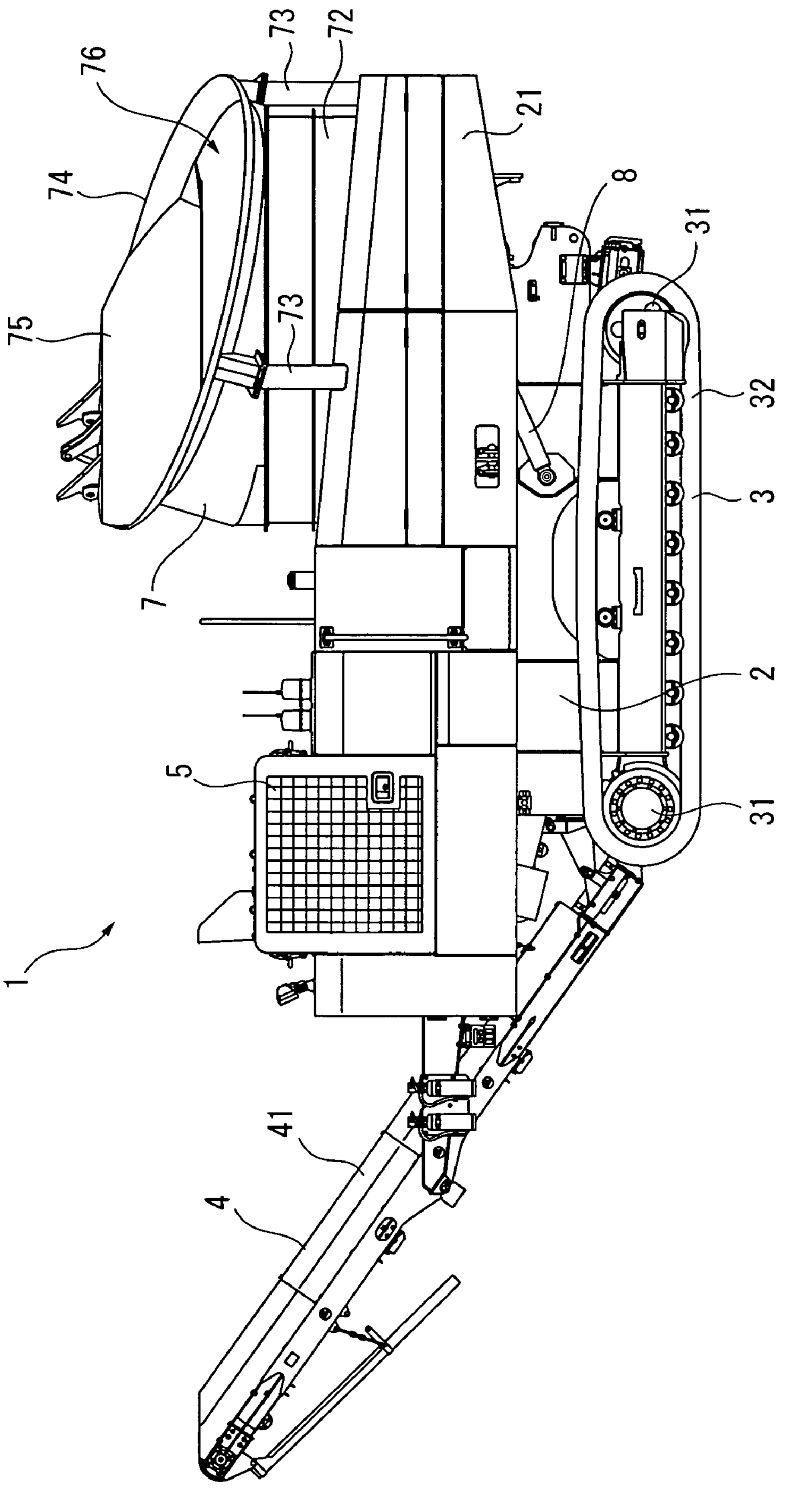
FIG. 1 is a side view showing a movable wood crushing machine according to an embodiment of the present invention.

1: Movable wood crushing machine
2: Vehicle body
3: Travel device
3A, 6A, 7A: Motor (Drive source)
4: Conveyer (Carrier)
5: Drive unit
6: Rotary crushing device
7: Tab-type feeder
8: Swinging mechanism
56 (translator's comment: "56" was a scribal error for "57"): Operation panel
57 (translator's comment: "57" was a scribal error for "58"): Net (Covering device)
63: Screen member
71: Tab receiving frame (Base plate)
72: Rotary tab
74: Hopper
75: Scattering prevention cover
76: charging opening
83: Coupling shaft
85: Swinging posture stopper (Swinging restricting section)

635: Opening peripheral section (upper edge of the screen member)

711: Opening

A: Horizontal distance between a coupling shaft of the tab-type feeder and an edge in the side thereof closer to the drive unit B: Vertical distance from the coupling shaft of the tab-type feeder to the final (translator's comment: "final" was a scribal error for "highest") section C: Horizontal distance from the coupling shaft of the tab-type feeder to an edge in the rear side D: Vertical distance from the coupling shaft of the tab-type feeder to the mounting surface O2: Rotary shaft WD: Wood to be crushed

BEST MODE FOR CARRYING OUT THE INVENTION

An embodiment of the present invention is described below with reference to the related drawings.

(1) General Configuration

Figure 2:
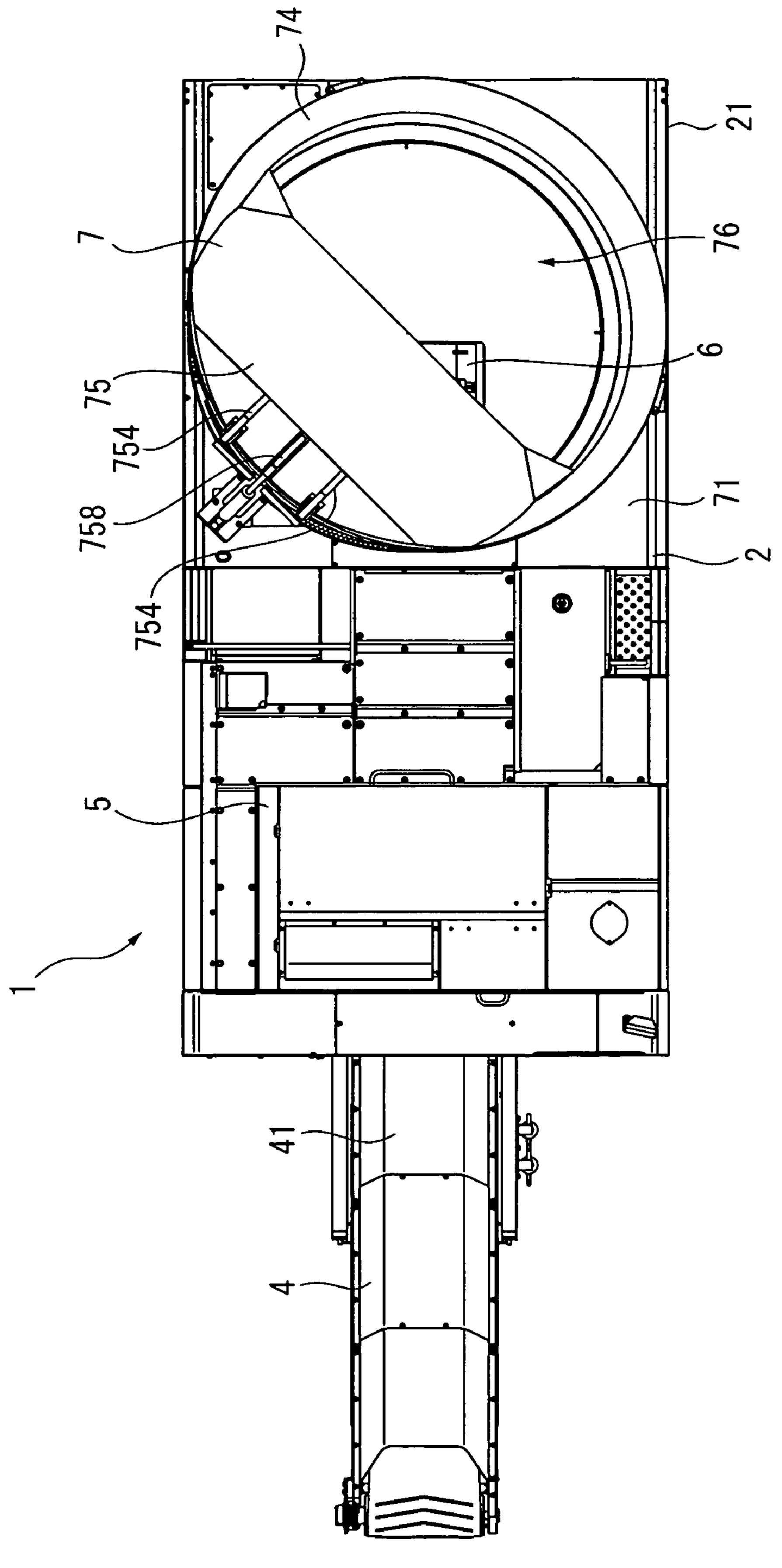
FIG. 2 is a plan view showing the movable wood crushing machine according to the embodiment above.
Figure 3:
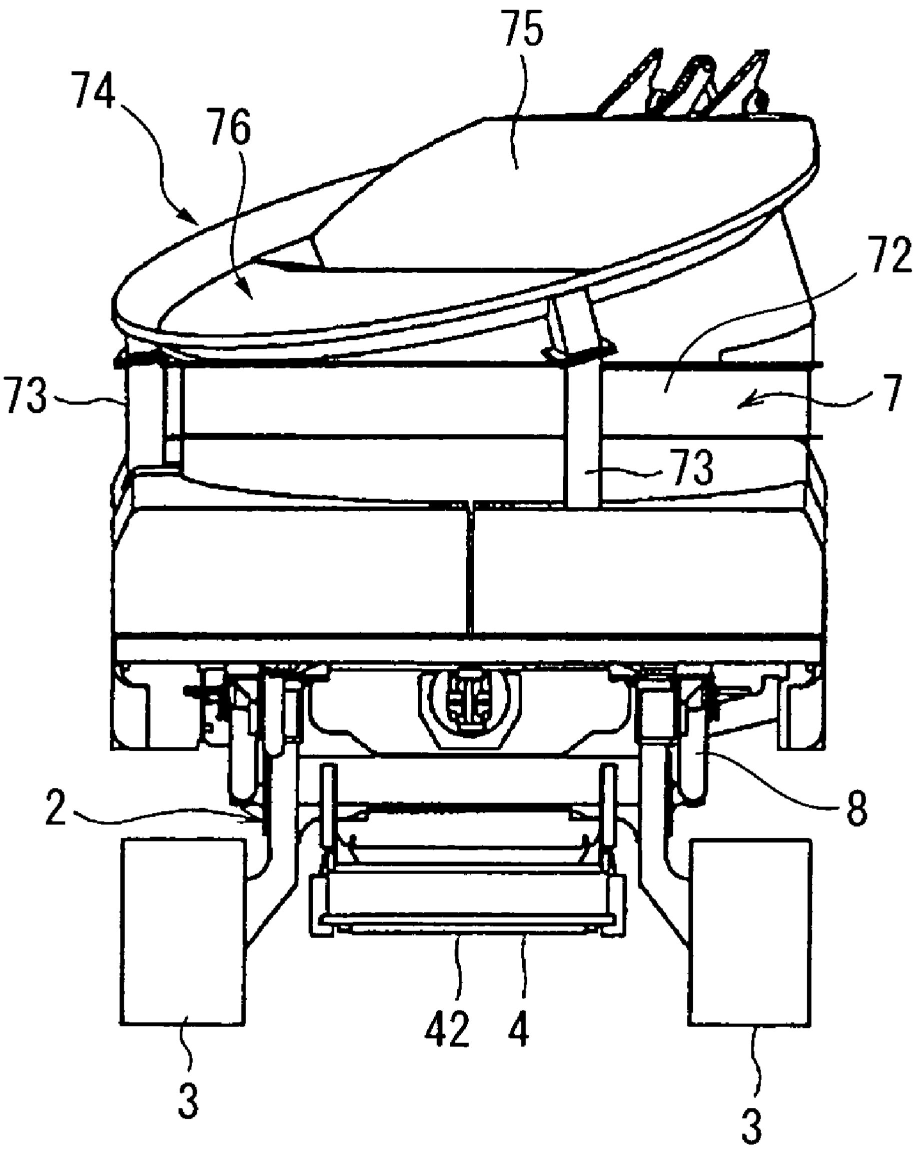
FIG. 3 is a rear view showing the movable wood crushing machine according to the embodiment above.

FIG. 1 to FIG. 3 show a movable wood crushing machine 1 according to an embodiment of the present invention. This movable wood crushing machine 1 comprises a vehicle body 2, a travel device 3, a conveyer 4 as a carrier, a drive unit 5, a rotary crushing device 6, and a tab-type feeder 7, and when wood is charged to the tab-type feeder 7, the wood is crushed with the rotary crushing device 6 and the crushed wood pieces are discharged with the conveyer 4 to the outside.

The vehicle body 2 comprising a steel-made frame body supports the conveyer 4, drive unit 5, rotary crushing device 6, and tab-type feeder 7 respectively. It is to be noted that the tab-type feeder 7 is supported via a swinging mechanism 8 provided on the vehicle body 2, and an external surface of the tab-type feeder 7 is covered with a feeder cover 21.

Provided on the vehicle body 2 is the tab-type feeder 7 at one edge side in the traveling direction (in the horizontal direction in FIG. 1) of the travel device 3, while the conveyer 4 is provided at the other edge side, and the drive unit 5 is provided between the components. In the following description, the traveling direction in which the movable wood crushing machine 1 moves toward the conveyer 4 is described as traveling direction, and the direction in which the movable wood crushing machine 1 moves toward the tab-type feeder 7 is described as backward direction.

The travel device 3 is a crawler type travel device provided in each of the two sides under the vehicle body 2, and comprises a pair of driving wheels 31 provided in side face edge sections of the vehicle body 2, and an endless track belt 32 wounded around the driving wheels 31 and contacting the ground surface. The endless track belt 32 is formed by coupling a plurality of track plates each with a projection provided on an outer surface thereof with pins or the like, and when a pair of the driving wheels 31 are rotated, the endless track belt 32 rotates to move the movable wood crushing machine 1.

The conveyer 4 comprises a first conveyer 41 extending diagonally upward from a central lower position of an edge face of the vehicle body 2 in the traveling direction and a second conveyer 42 (Refer to FIG. 3) extending downward to the rotary crushing device 6 between a pair of travel devices 3 provided under the vehicle body 2.

The drive unit 5 is a portion for driving drive sources for the travel device 3, conveyer 4, rotary crushing device 6, and tab-type feeder 7, and comprises an engine driven with a fuel oil such as light oil, an hydraulic pump driven by the engine, and a hydraulic pressure feed path for feeding oil from the hydraulic pump to hydraulic motors as drive sources for the components.

The rotary crushing device 6 is a device for crushing wood supplied to the tab-type feeder 7, and comprises a rotary shaft rotated by the hydraulic motor as a drive source, a rotary drum provided around this rotary shaft, and a plurality of bits embedded on an external peripheral surface of this rotary drum.

The tab-type feeder 7 feeds wood charged by a loader to the rotary crushing device 6, and comprises a rotary tab 72 rotatably supported on and by a tab receiving frame 71 as a base plate, a hopper 74 provided on this rotary tab 72 via a column 73, and a scattering prevention cover 75 provided above this hopper 74. A portion of the hopper 74 in which the scattering prevention cover 75 is not provided is a charging opening 76 for charging wood.

Structures of the drive unit 5, rotary crushing device 6, and tab-type feeder 7 in the movable wood crushing machine 1 described above are described in detail below.

[2] Structure of the Drive Unit 5

Figure 4:
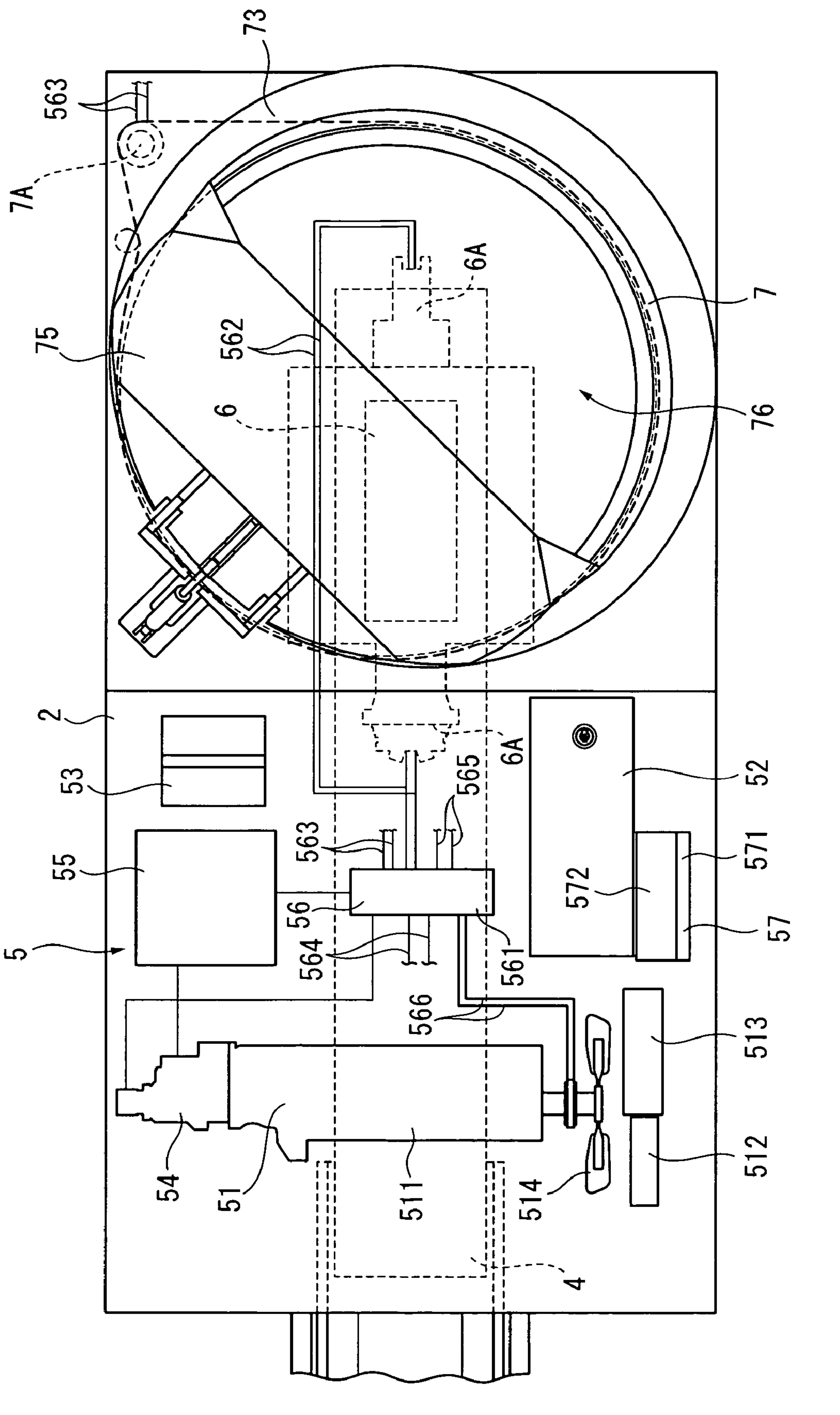
FIG. 4 is a schematic plan view showing a drive unit in the embodiment above.
Figure 5:
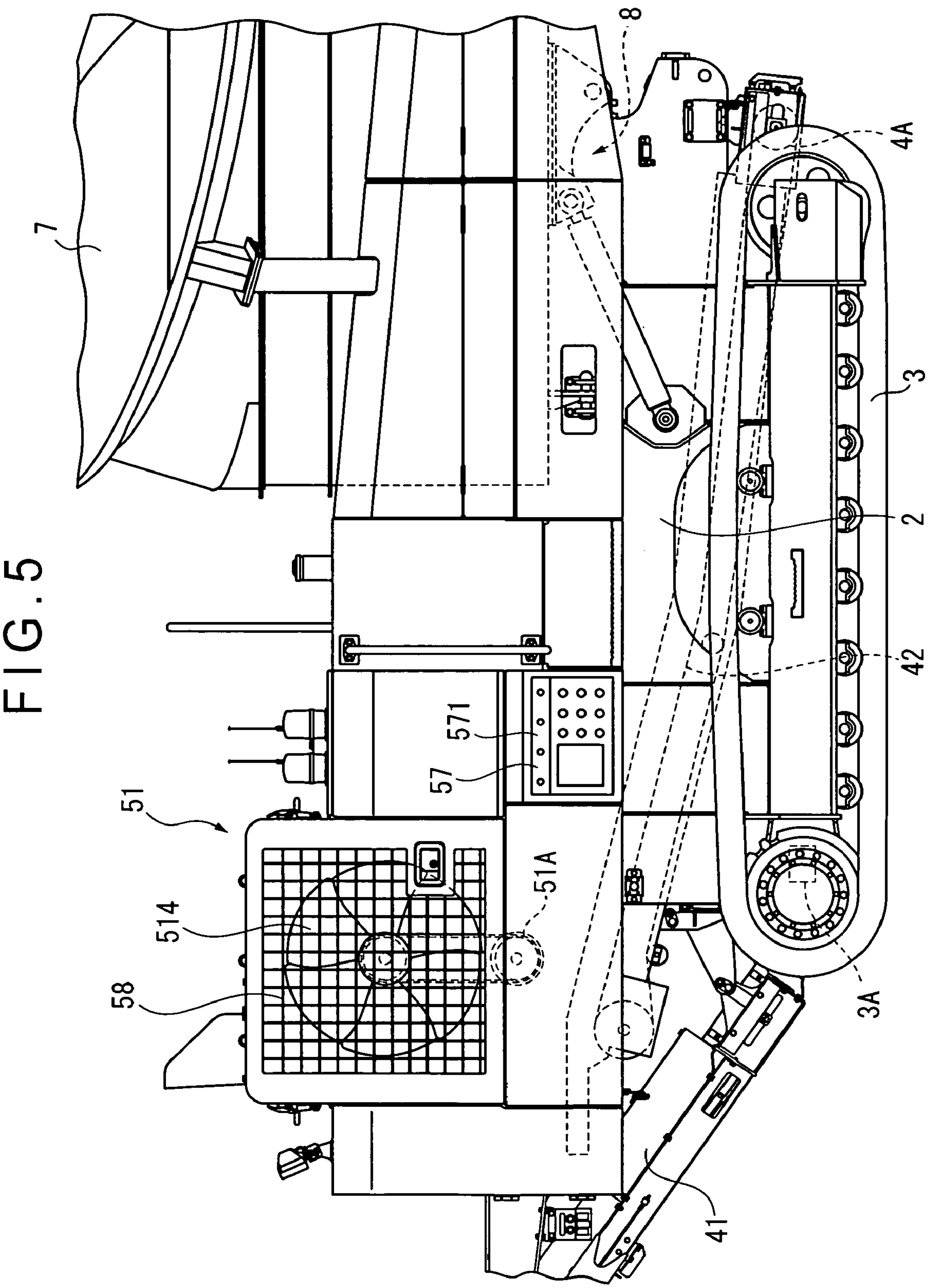
FIG. 5 is a side view showing a drive unit according to the embodiment.

FIG. 4 and FIG. 5 each show a schematic structure of the drive unit 5 provided at a substantially central portion of the movable wood crushing machine 1.

This drive unit 5 comprises an engine 51, a fuel oil tank 52, a battery 53, a hydraulic pump 54, a hydraulic oil tank 55, an operating valve 56, and an operation panel 57, and drives the hydraulic pump 54 with the engine 51 as a power source, and drives the components by feeding a hydraulic oil to the hydraulic motors from the operating valve 56.

The engine 51 comprises an engine body 511 such as a diesel engine, a radiator 512 for cooling this engine body 511, an oil cooler 513, and a fan 514.

Connected to this engine 51 are the fuel oil tank 52 via a fuel feed pipe (not shown), and the battery 53 via electric wiring, and when a fuel is fed from the fuel oil tank 52, the engine 51 starts driving with the battery 53.

Further a cooling air inlet port is provided on a side face of the movable wood crushing machine 1 on which the radiator 512 and oil cooler 513 are provided and this opening is covered with a net 58 as a covering device.

The hydraulic pump 54 functions as a hydraulic oil feeder driven by the engine 51, and feeds hydraulic oil inside the hydraulic oil tank 55 when driven by the engine 51 with a prespecified pressure to the operating valve 56.

The operating valve 56 supplies the hydraulic oil from the hydraulic pump 54 to each of the hydraulic motors provided in the travel device 3, conveyer 4, rotary crushing device 6, and tab-type feeder 7 selecting each according to the necessity, and comprises a valve body 561 and piping paths 562 to 566.

Specifically the piping path 562 is used for feeding hydraulic oil from the valve body 561 to a mill motor 6A for driving the rotary crushing device 6, the piping path 563 is used for feeding hydraulic oil to a tab motor 7A for driving the tab-type feeder 7, piping path 564 is used for feeding hydraulic oil to a conveyer motor 4A for driving the conveyer 4, piping path 565 is used for feeding hydraulic oil to a travel motor 3A for driving the travel device 3, and piping path 566 is provided under the fan 514 as shown in FIG. 5, and is used for feeding hydraulic oil to a fan-driving motor 51A coupled to this fan 514 with a V belt or the like.

The operation panel 57 is a section for switching the operating valve 56 according to an input by an operator for providing controls such as staring or stopping an operation of the engine 51, and comprises an operation panel 571 exposed on a side face of the movable wood crushing machine 1 and a controller body 572 provided inside this operation panel 571.

The operation panel 571 has, in addition to switches used by an operator for starting or stopping operations, operating state display lamps for displaying the operating state, and indicators for indicating whether each of the hydraulic motors is in the overloaded state or not, or whether a temperature of cooling water for the engine 51 is in the normal range or not, and when a controller body 572 detects an abnormal state with sensors or the like provided in various sections, any of the indicators lights up to indicate the abnormal section for alerting the operator to check the section. The operating state display lamps and the like are mounted on a side in the lateral direction of the movable wood crushing machine 1, and can visually be checked from the outside via a transparent acrylic cover covering this panel surface. Further when any abnormal state is generated, a turning lamp is lit in the upper section of the operation panel so that the operator can visually check the state.

[3] Structure of the Rotary Crushing Device 6

Figure 6:
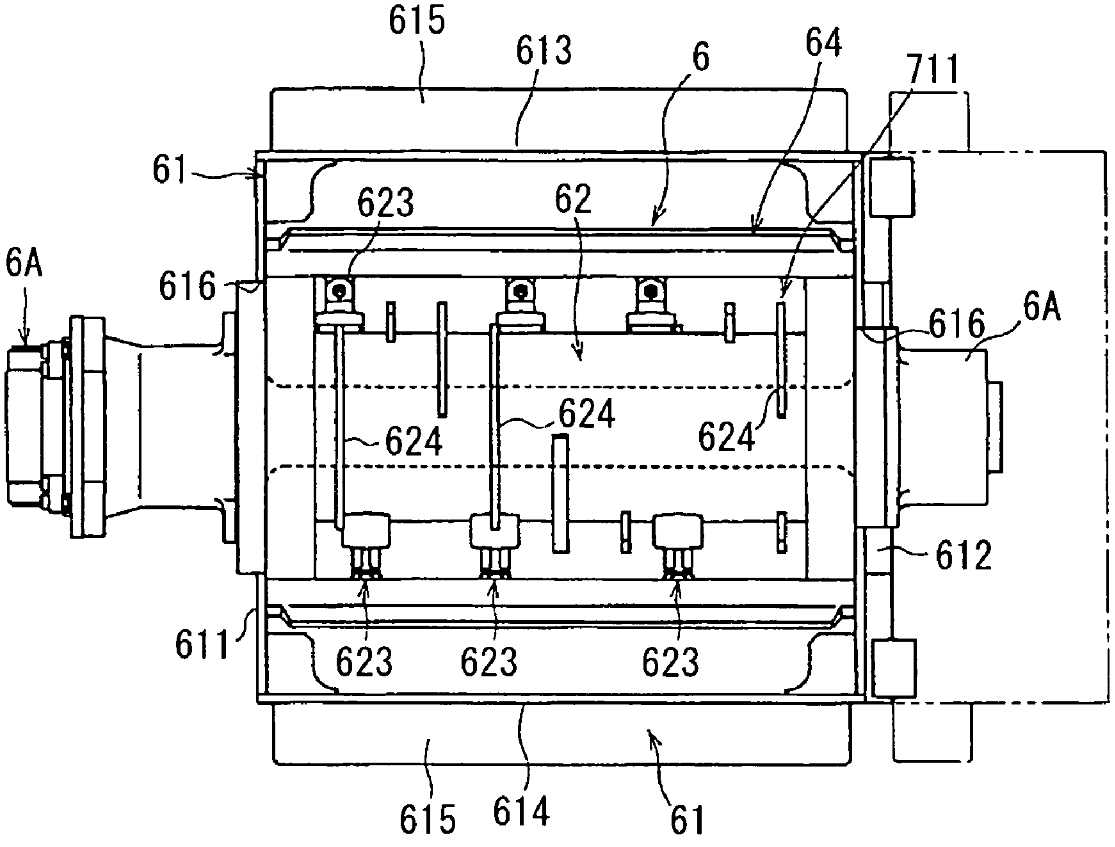
FIG. 6 is a plan view showing a rotary crushing device in the embodiment.
Figure 7:
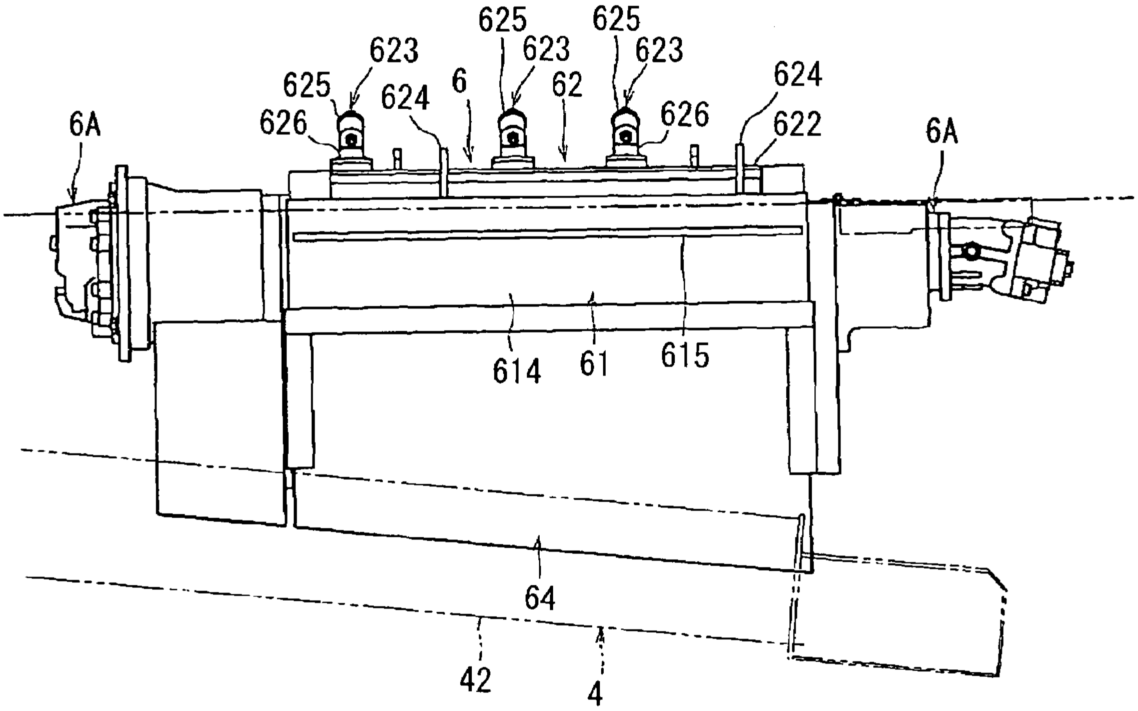
FIG. 7 is a side view showing the rotary crushing device.
Figure 8:
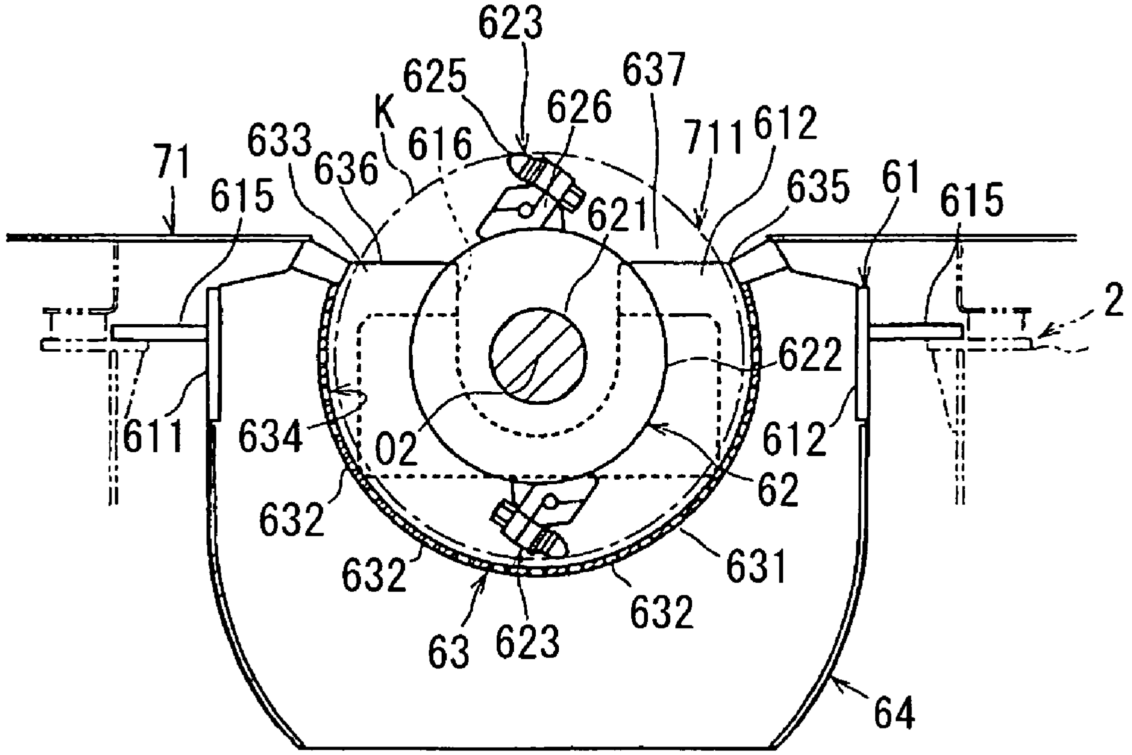
FIG. 8 is a rear view showing the rotary crushing device.

FIG. 6 to FIG. 8 each show a structure of the rotary crushing device 6, this rotary crushing device 6 is provided under the tab-type feeder 7, and comprises a support frame 61 attached to the vehicle body 2, a rotary crusher 62 supported by the support frame 61 and rotating around a substantially horizontal axis and a screen member 63 surrounding this rotary crusher 62 from the outside, and when the rotary crusher 62 is rotated by the mill motor 6A provided at an edge section thereof, the rotary crusher 62 crushes wood.

The support frame 61 has a front wall 611, a rear wall 612, and a pair of side walls 613, 614, and a collar section 615 for mounting projects outward from each of the side walls 613, 614.

This collar section 615 is fixed with a fitting tool (not shown) such as a bolt member or the like to a frame of the vehicle body 2. Although described in details later, an opening 711 having a rectangular form when viewed from the top is formed on the tab receiving frame 71 forming a bottom section of the tab-type feeder 7, and the support frame 61 is positioned on a rear surface of the tab receiving frame 71 at a position opposite to this opening 711, and the rotary crusher 62 of the rotary crushing device 6 is exposed from the opening 711 of the tab receiving frame 71.

The rotary crusher 62 has a shaft section 621 and a rotary drum 622, and the two edges are rotatably supported by the front wall 611 and the rear wall 612 of the support frame 61.

Specifically, a notch 616 is formed on each of the front and rear walls 611, 612 of the support frame 61, and the rotary crusher 62 is engaged in the notch 616.

The shaft section 621 is a shaft-like body extending along the rotating shaft of the rotary crusher 62, and the two edges thereof are coupled to the mill motor 6A as a drive source.

The rotary drum 622 is a cylindrical body rotatably provided around the rotation axis of this shaft 621 and a plurality of crushing sections 623 and protectors 624 are provided on an external peripheral surface of the rotary drum 622.

The crushing section 623 has a plurality of bits 625 and holders 626 dismountably holding the bits 625 respectively as shown in FIG. 7, and when the rotary drum 622 rotates, the bits are also turned in association with rotation of the rotary drum 622 to strike and crush the wood.

The protector 624 is a plate-like body projecting outward in the radial direction of the rotary drum 622 and extending along the rotational direction.

The screen member 63 is a substantially cylindrical body with a number of discharge holes 632 provided on a peripheral wall 631 surrounding the rotary drum 622, and edge sections in the longitudinal direction along the substantially horizontal center line are attached to the front and rear walls 611, 612 respectively.

A portion of the peripheral wall 631 of the screen member 63 is notched to form an upper opening 633. A clearance 634 is formed between an inner surface of the screen member 63 and an external surface of the rotary drum 622.

A curvature of the internal surface of the screen member 63 is set to a value slightly larger than a radius of the track K drawn by a tip of the bit 625 of the crushing section 623 when the rotary crusher 62 rotates.

Further an opening edge rim section 635 of the screen member 63 is positioned at a higher level than a rotation center O2 of the rotating shaft of the rotary crusher 62. Because of this feature, as shown in FIG. 7, the clearance 634 formed between an internal surface of the screen member 63 and an external peripheral surface of the rotary drum 622 has a feeding side opening 636 having a rectangular form when viewed from the top and a discharge side opening 637 also having a rectangular form when viewed from the top.

In the rotary crushing device 6 as described above, different from the crushing machine based on the conventional technology, a deflector is not provided at the opening, and a space above the opening 711 formed in the bottom section of the tab-type feeder 7 is secured up to the scattering prevention cover 75 provided in the hopper 74 of the tab-type feeder.

A cover member 64 surrounding the rotary crusher 62 is provided under the support frame 61, and this cover member 64 guides wood chips crushed by the rotary crusher 62 and having passed through discharge holes 632 of the screen member 63 to the conveyer 4.

[4] Structure of the Tab-Type Feeder 7

Figure 9:
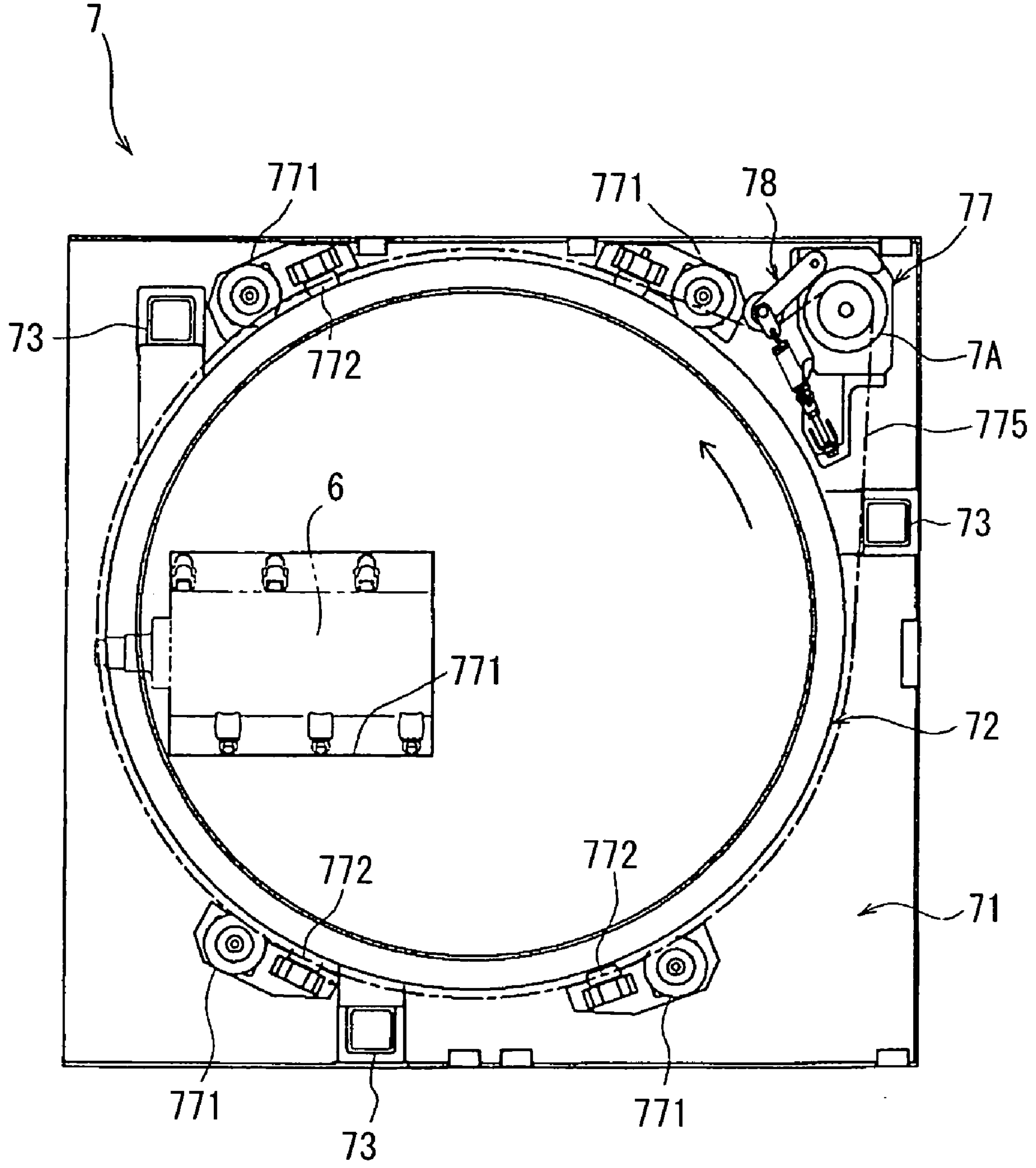
FIG. 9 is a cross-sectional plan view showing a relation between a tab-type feeder and a rotary mechanism in the embodiment above.

The tab-type feeder 7 has, in addition to the tab receiving frame 71, rotary tab 72, column 73, hopper 74, and scattering protection cover 75 shown in FIG. 1 to FIG. 3, a rotary mechanism 77 for rotating the rotary tab 72 and a tension loading mechanism 78 as shown in FIG. 9, and the rotary tab 72 is rotated on the tab receiving frame 71 by the rotary mechanism 77 with the tab motor 7A as a drive source.

The tab receiving frame 71 comprises a plate-like body provided on the vehicle body 2 via the swinging mechanism 8, and an opening 711 for feeding wood therethrough to the rotary crushing device 6 is provided at a position corresponding to a position of the rotary crushing device 6.

(4-1) Structure of the Rotary Tab 72

The rotary tab 72 comprises, as shown in FIG. 10A, FIG. 10B, FIG. 11, and FIG. 12, a tab body 721 having a cylindrical form, a pair of external collar sections 722, 723 for guidance each projecting from an external surface of this tab body 721, a sprocket 724, a guide member 725, an external collar section 726, a projection 727 projecting from an inner surface of the tab body 721, and an internal collar section 728.

Figure 10A:
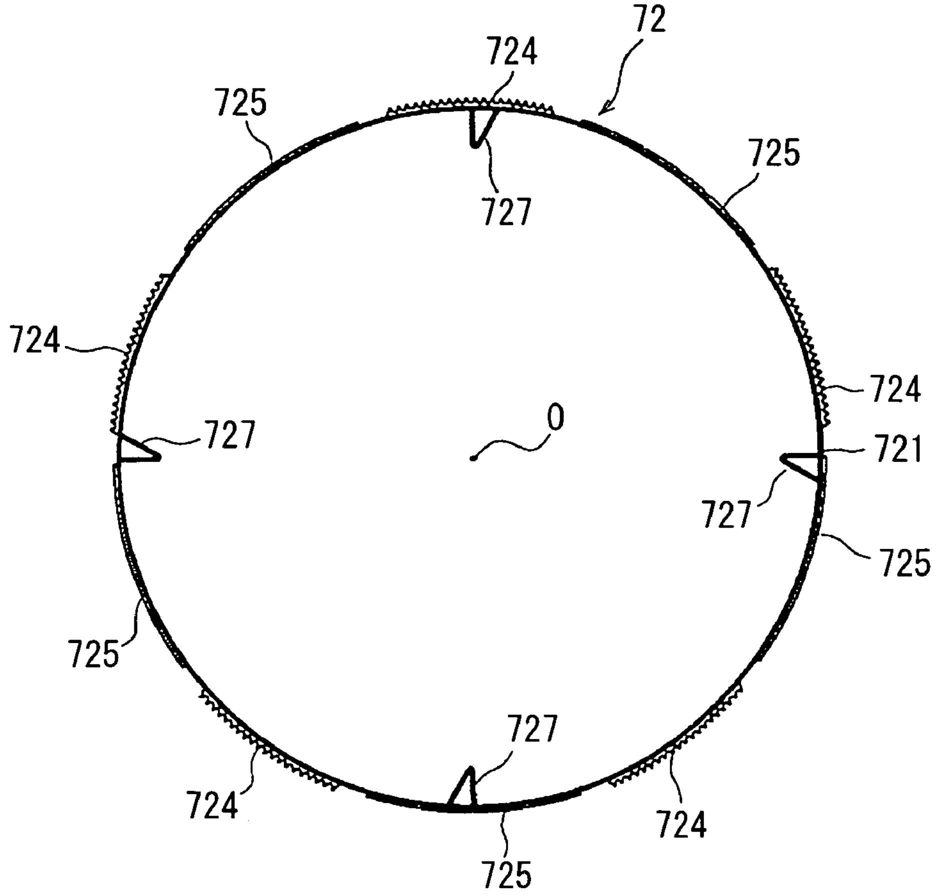
FIG. 10A is a simplified cross-sectional plan view of a rotary tab in the embodiment.

The tab body 721 is a cylindrical body having a rotation center O as shown in FIG. 10A.

A pair of the external collar sections 722, 723 are provided on an external peripheral surface at the lower edge section of the tab body 721, and extend completely around the tab body 721 along the peripheral direction thereof, and the external collar sections 722 and 723 are provided substantially in parallel to each other. A space between the external collar sections 722, 723 is described as a guide grove extending along the periphery of the tab body 721.

Figure 11:
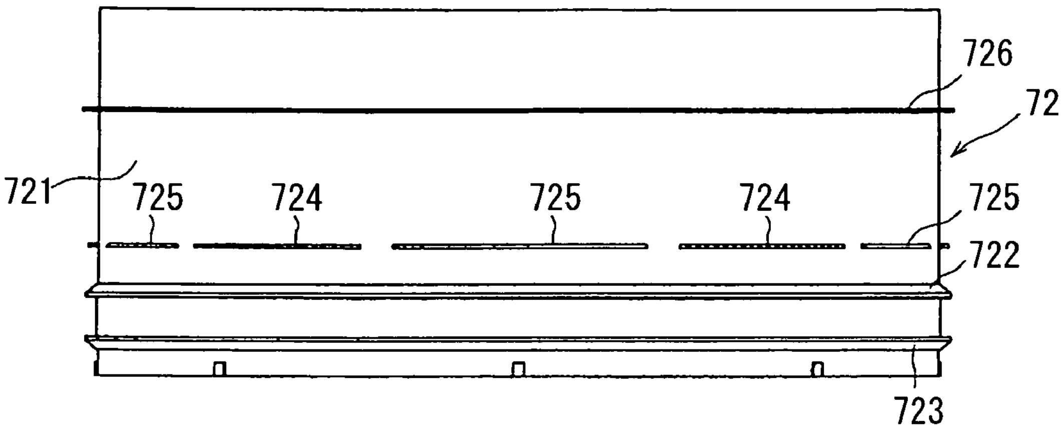
FIG. 11 is a front view showing the rotary tab in the embodiment.

The sprocket 724 and the guide member 725 are provided in the protruding state above the external collar section 722 for guidance as shown in FIG. 11, and extend around the tab body 721 substantially in parallel to the external collar section 722 for guidance.

Figure 10B:
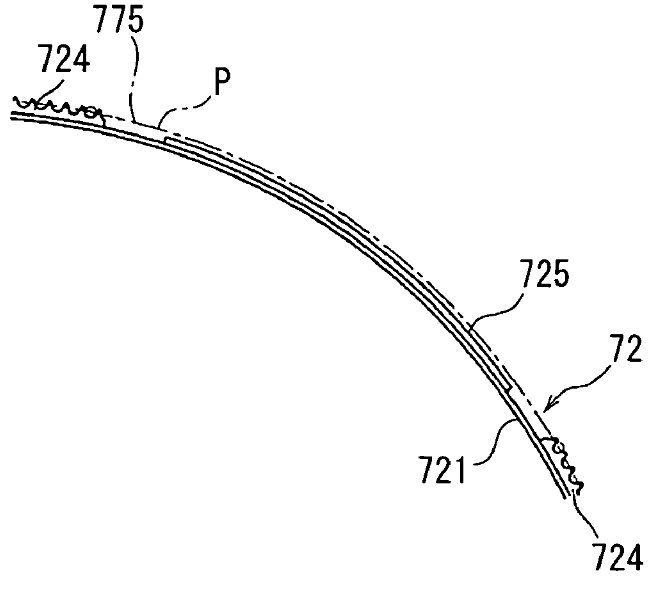
FIG. 10B is an enlarged cross-sectional view showing a key section of the rotary tab in the embodiment.

The sprocket 724 and the guide member 725 are provided alternately in the peripheral direction of the tab body 721 as shown in FIG. 10B, and although described later a gear teeth row is formed at a tip of the sprocket 724, and the projection of the tip section of the guide member 725 is smaller than that of the gear teeth row of the sprocket 724 and is set at the height at which a pitch circle P formed by the sprocket 724 can substantially be maintained by a chain 775 described later.

The external collar section 726 is provided further above the sprocket 724 and the guide member 725 and projects from an external peripheral surface of the tab body 721 and continuously extends in the peripheral direction of the tab body 721.

Figure 12:
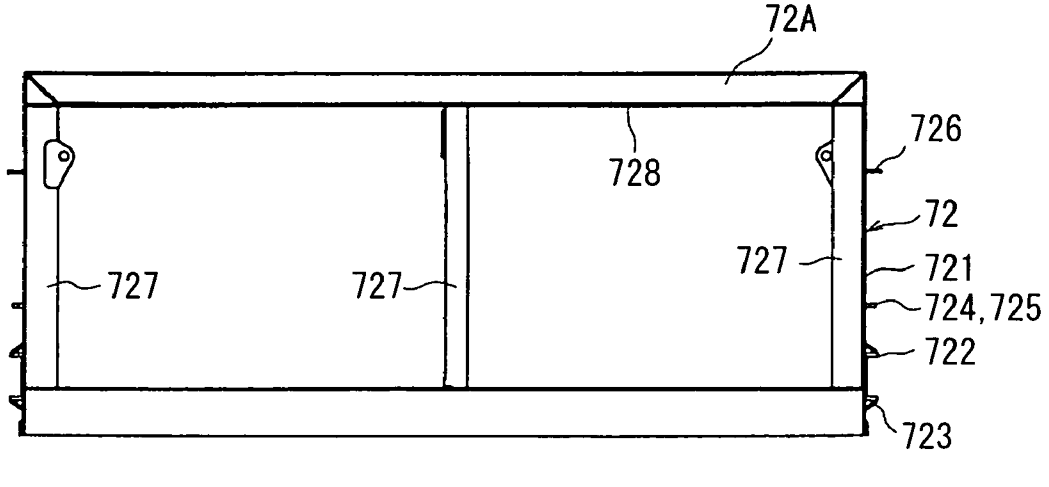
FIG. 12 is a cross-sectional front view showing the rotary tab in the embodiment.

As shown in FIG. 10A and FIG. 12, the projections 727 protrude upward and downward on an internal peripheral surface of the tab body 721, and in this embodiment, are provided with a prespecified pitch at four places in the peripheral direction. Each of the projections 727 has a front section in the rotating direction along the normal direction to the internal peripheral surface of the tab body 721, and a rear section in the rotating direction has a substantially right-triangular and flat form inclined more as compared to the front section.

An internal collar section 728 extends in the projecting state completely around the tab body 721 along the peripheral direction of the tab body 721 at a position close to an upper opening 72A of the tab body 721.

(4-2) Structure of the Rotary Mechanism 77

The rotary mechanism 77 comprises, as shown in FIG. 9, horizontal rollers 771 and vertical rollers 772 provided at four positions around the rotary tab 72, a support frame 773 for supporting the tab motor 7A described above, a sprocket 774 provided at an output shaft 7A1 of the tab motor 7A, and a chain 775 wounded around the rotary tab 72.

Figure 13:
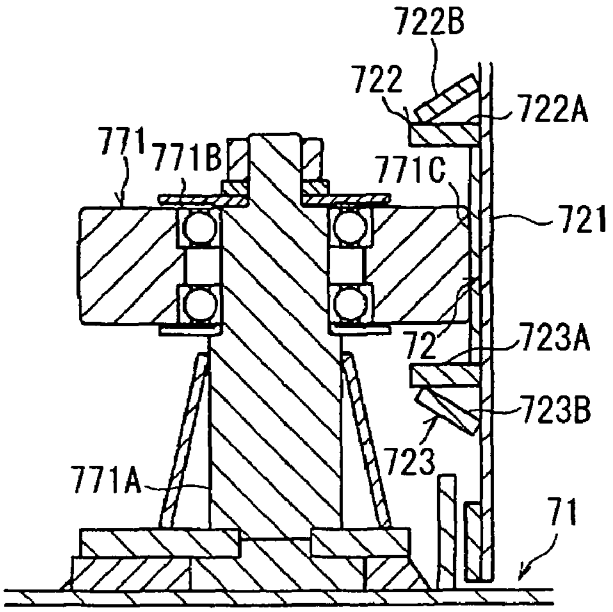
FIG. 13 is a cross-sectional view showing a horizontal roller for guiding rotation of the rotary tab in the embodiment.

As shown in FIG. 13, the horizontal roller 771 is rotatably supported via a bearing 771B by a column 771A provided in the upright state on the tab receiving frame 71, contacts a receiving plate member 771C provided in the guide groove between the external collar sections 722, 723 for guidance provided in an external peripheral surface of the tab body 721, and rotates in association with rotation of the rotary tab 72.

Figure 14:
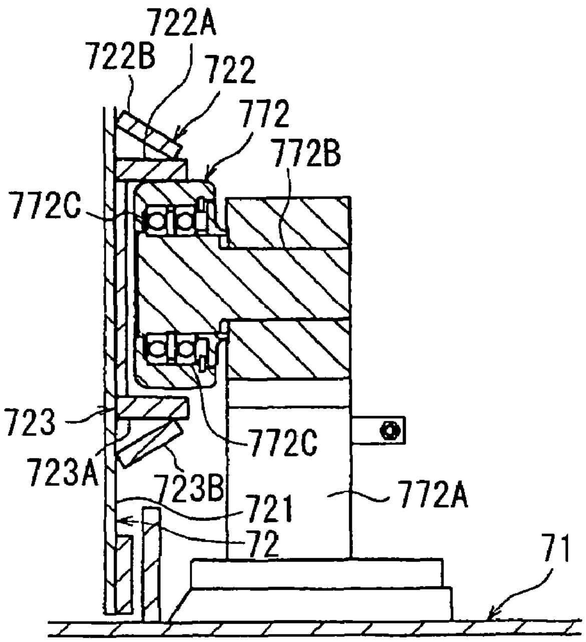
FIG. 14 is a cross-sectional view showing a vertical roller for receiving the rotary tab in the embodiment.

As shown in FIG. 14, the vertical roller 772 is rotatably supported via a bearing 772C by a support shaft 772B projecting in the horizontal direction from an upper edge of the column 772A provided in the upright state on the tab receiving frame 71, contacts the external collar section 722 for guidance in the upper side to support the tab body 721, and rotates in association with rotation of the rotary tab 72. The external collar sections 722, 723 are jointed with the main bodies 722A, 723A projecting outward in the horizontal direction from the tab body 721 at tip sections of the main bodies 722A, 723A in the diagonal direction, and contact the vertical roller 772 at the portion of the main body 722A in the upper side.

Figure 15:
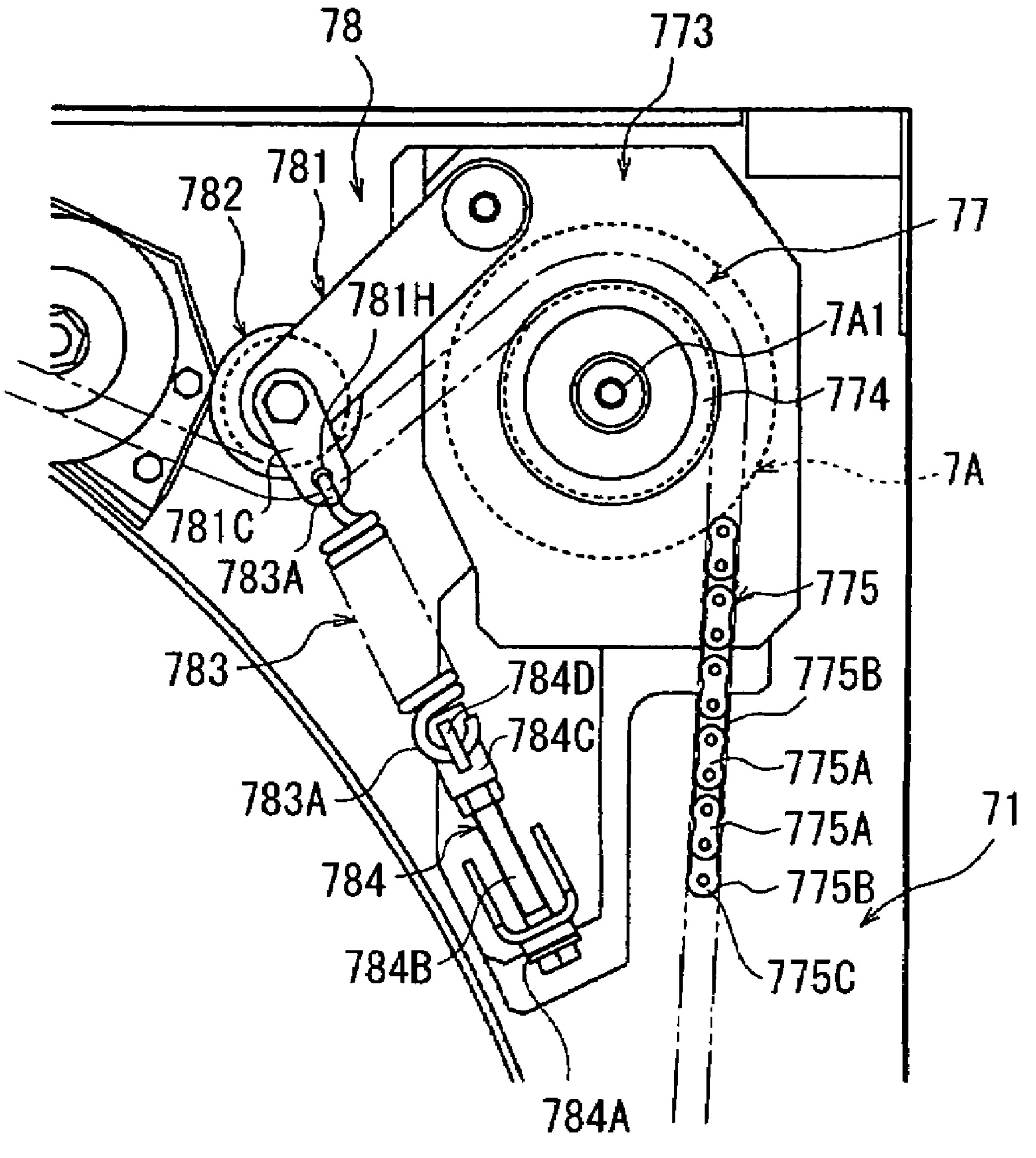
FIG. 15 is an enlarged plan view showing a tab rotary mechanism in the embodiment.
Figure 16:
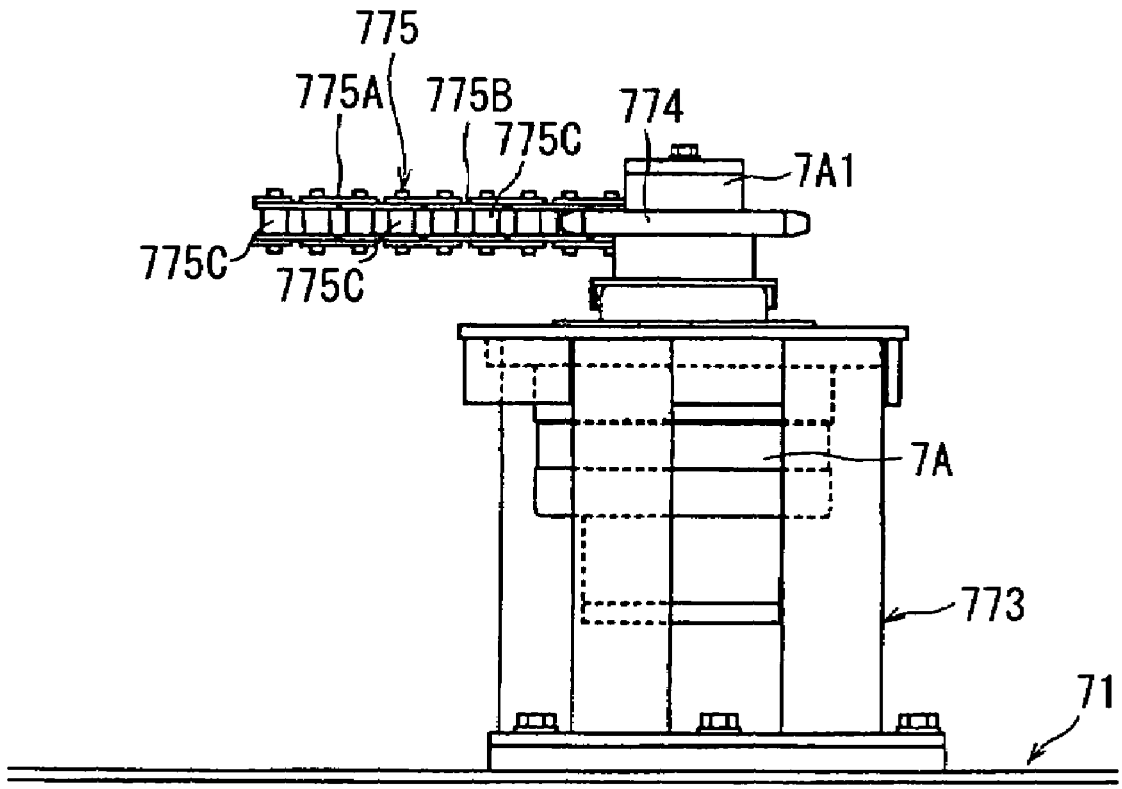
FIG. 16 is an enlarged view showing a drive source for the tab rotary mechanism in the embodiment.

The support frame 773 is provided, as shown in FIG. 15 and FIG. 16, on the tab receiving frame 71, and a tension loading mechanism 78 described later is provided at an edge section of this support frame 773.

The sprocket 774 is fixed to the output shaft 7A1 of the tab motor 7A, and when the output shaft 7A1 rotates, also the sprocket 774 rotates.

The chain 775 is a roller chain formed by coupling a pin link 775A to a roller link 775B alternately via a pin 775C.

This chain 775 is built with a large and circular form, and is built to wrap around the rotary tab 72 and the sprocket 774 provided on the tab motor 7A, and engages with an external peripheral surface of the sprocket 774, and also engages with the sprocket 724 provided in the projecting state on an external peripheral surface of the rotary tab 72.

The sprocket 724 and the guide member 725 in the rotary tab 72 are provided at the same position in the vertical direction, so that, when the chain 775 is engaged with the sprocket 724, a tip section of the guide member 725 closely contacts an internal surface of the chain 775 and guides the chain 775.

Figure 17:
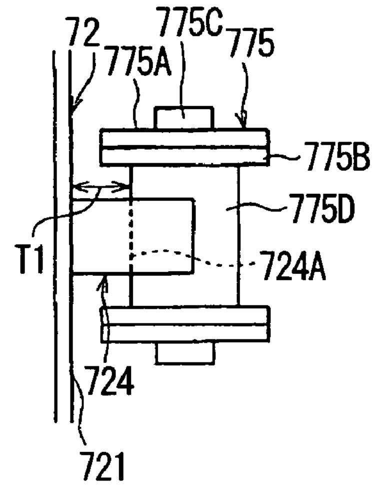
FIG. 17 is a cross-sectional view showing engagement between a chain constituting the tab rotary mechanism and a sprocket provided in the rotary tab in the embodiment.

More specifically, when the chain 775 is engaged with the sprocket 775 as shown in FIG. 17, a roller 775D with a pin 775C inserted therein engages with a concave teeth 724A of the sprocket 724, and an external peripheral surface of the roller 775D rotates contacting an internal surface of the concave teeth 724A.

Figure 18:
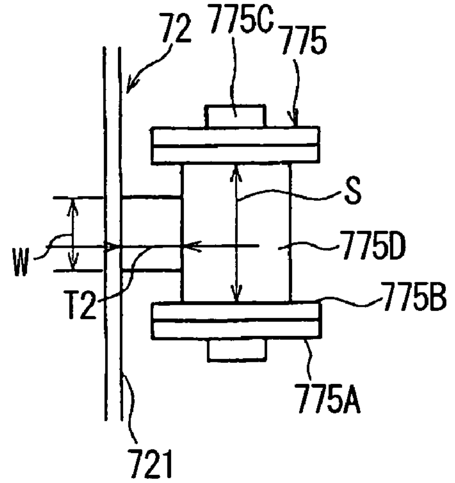
FIG. 18 is a cross-sectional view showing a relation between a tab driving chain and a guide member in the embodiment.

On the other hand, the guide member 725 is inserted between and engaged with the pink link 775A and roller link 775B opposite to each other on the chain 775 as shown in FIG. 18, and the tip section closely contacts an internal peripheral surface of the roller 775D, so that the pitch circle P formed with the sprocket 724 can substantially be maintained by the chain 775 as described above (Refer to FIG. 10B).

As for the dimensions of the components described above, the height T1 of the tab body 721 of the rotary tab 72 from the external surface thereof to a bottom of the concave teeth 724A of the sprocket 724 is set to the substantially same value as the thickness T2 of the guide member 725, and further the dimension S between roller links 775B opposite to each other of the chain 775 is larger than the dimension W of the guide member 725 in the vertical direction.

(4-3) Structure of the Tension Loading Mechanism 78

The tension loading mechanism 78 comprises a swinging arm 781, a sprocket 782, an elastic member 783, and an adjusting member 784 as shown in FIG. 15.

Figure 19:
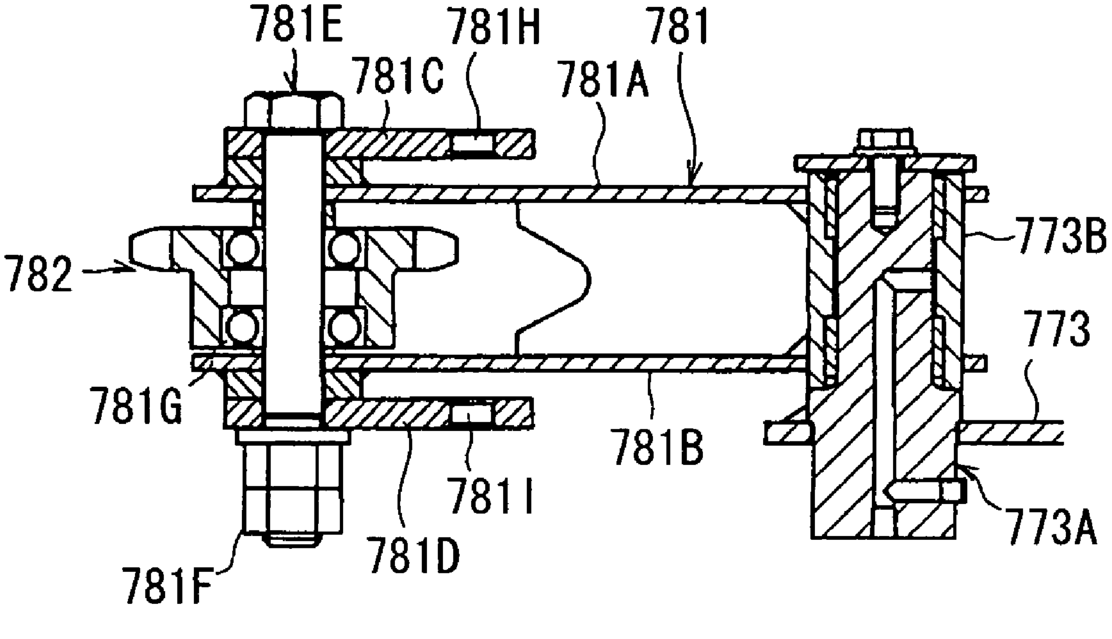
FIG. 19 is a cross-sectional view showing a key section of a tab driving chain tension loading mechanism in the embodiment.

As shown in FIG. 19, an edge of the swinging arm 781 is externally engaged with a support shaft 773A provided in the upright state on the support frame 773 so that a boss section 773B can rotate, and the edge of the swinging arm 781 is fixed to this boss section 773B at the edge thereof to swing around a center of the support shaft 773A.

This swinging arm 781 has a pair of flat plate bodies 781A, 781B provided in the upper and lower sides respectively, and the sprocket 782 is mounted between the flat plate bodies 781A, 781B at the other edge of the swinging arm 781 in the contrary side from the center for swinging.

Further an upper coupling piece 781C is provided on the flat plate body 781A in the upper side, and a lower coupling piece 781D is provided on the flat plate body 781B in the lower side.

A bolt member 781E penetrates these upper coupling piece 781C, flat plate body 781A, sprocket 782, flat plate body 781B, and lower coupling piece 781D, and a nut member 781F is screwed onto a tip portion of the screw section of this bolt member 781E.

The sprocket 782 is rotatably mounted via a bearing 781G externally mounted on a shaft section of the bolt member 781E.

Figure 20:
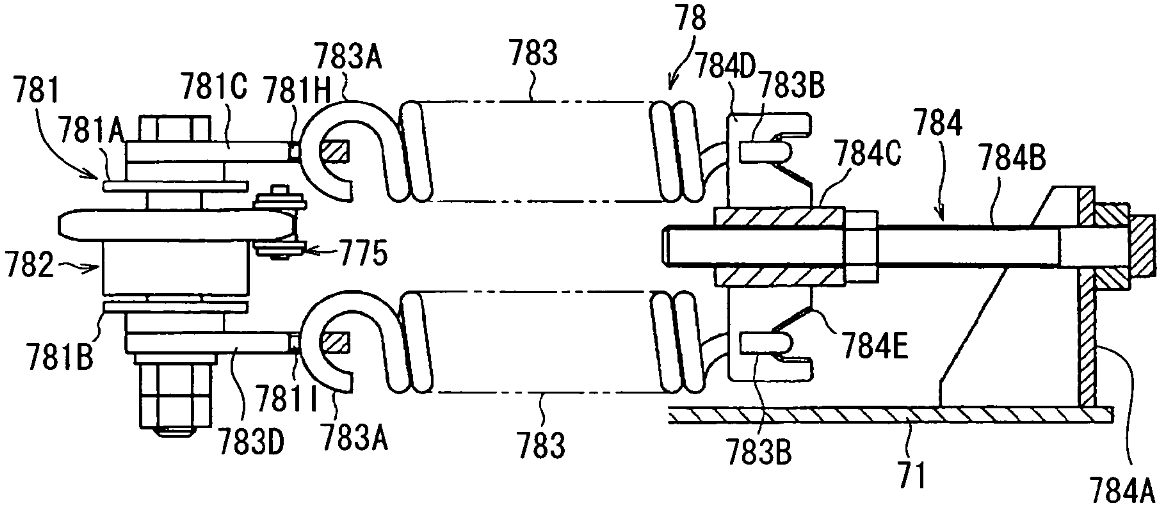
FIG. 20 is an enlarged view showing a key section of a tension loading mechanism for loading a tension to the tab driving chain in the embodiment.

Hooking holes 781H, 781I are formed in the upper coupling piece 781C and lower coupling piece 781D respectively, and a hook section 783A provided at one edge of the elastic member 783 such as a coil spring is hooked in each of the hooking holes 781H, 7811 as shown in FIG. 20.

A hook section 783B provided at the other edge of this elastic member 783 is coupled to the adjusting member 784.

The adjusting member 784 has a fixed frame 784A, a bolt member 784B, a nut member 784C, and hooking pieces 784D, 784E as shown in FIG. 20.

The fixed frame 784A is a plate body provided on the tab receiving frame 71 in the upright state, and is positioned so that the pulling direction of the elastic member 783 is oriented toward an outer side from a surface of the fixed frame 784A with a throughhole formed in the upper section thereof. Provided on a surface of the fixed frame 784A with the elastic member 783 provided thereon is a reinforcing rib plate perpendicular thereto.

The bolt member 784B is inserted into the throuhghole formed in the fixed frame 784A, and a bolt head of the bolt member 784B is positioned on a surface of the fixed frame 784A in the contrary side from the surface on which the elastic member 783 is provided.

The nut member 784C is screwed onto a tip portion of the bolt member 784B, and the nut member 784C makes it possible to change positions of the bolt member 784B for forward and backward movement in the axial direction by changing a screwed position of the nut member 784C with the bolt member 784B.

The hooking piece 784D is a plate body provided on an external peripheral surface of the nut member 784C in the protruding state, and a surface of the plate body is provided along the axial direction of the bolt member 784B. A notched concave section is formed on a side edge of this hooking piece 784D in the side close to the fixed frame 784A, and the hooking section 783B at the other edge of the elastic member 783 is engaged in this concave section.

In the tension loading mechanism 78 having the structure as described above, as shown in FIG. 15, the sprocket 782 is engaged in the external peripheral side of the chain 775 to energize the chain 775 from the outside, so that an appropriate tension is loaded to the chain 775.

For adjusting the energizing force, as shown in FIG. 20, when the screwed position of the nut member 784C is changed to the fixed frame 784A, a tensile force of the elastic member 783 increases, so that the sprocket 782 is pulled and energized in a direction in which the chain 775 is pressed, and therefore a force of the chain 775 for tightening the rotary tab 72 becomes larger. On the contrary, when the screwed position of the nut member 784C is moved away from the fixed frame, a tensile force of the sprocket 782 toward the fixed frame 784A becomes smaller, and therefore a force of the chain 775 for tightening the rotary tab 72 becomes smaller.

As described above, by adjusting a screwed position of the nut member 784C, a tension to be loaded to the chain 775 is adjusted.

(4-4) Structure of the Hopper 74

Figure 21:
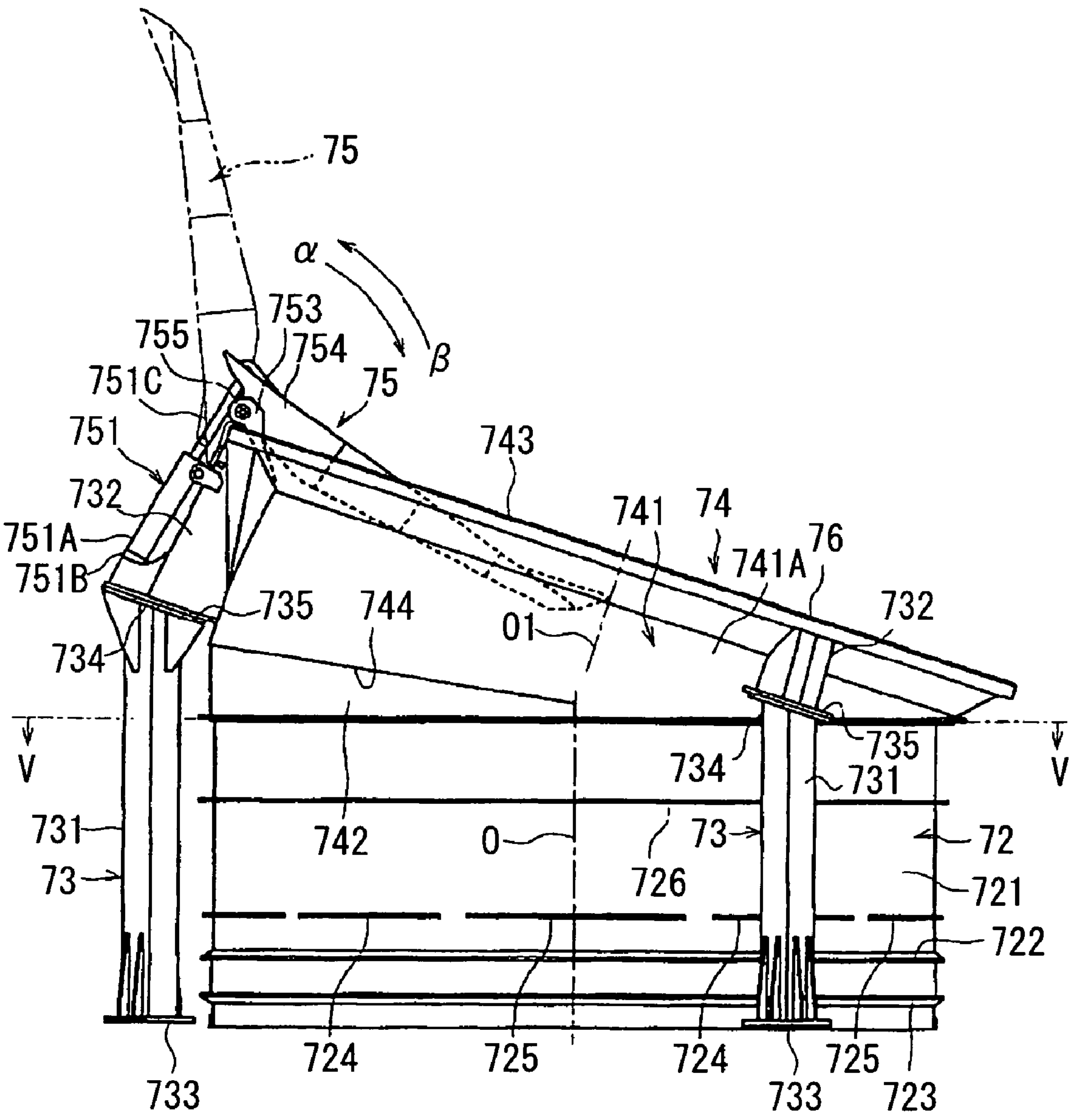
FIG. 21 is a side view showing a relation between the rotary tab and a hopper in the embodiment.

The hopper 74 has a charging opening 76 for charging wood inclined against the horizontal surface, and a scattering protection cover 75 is provided over and covers a portion of this charging opening 76. Namely, as shown in FIG. 21, the hopper 74 is a substantially cylindrical body having the charging opening 76 inclined against the rotary tab 72 having a substantially cylindrical form so that the opening 76 is inclined against the horizontal face, and has a portion with a large height and a portion with a small height.

This hopper 74 is supported on and by the tab receiving frame 71 (not shown in FIG. 21) provided on the vehicle body 2 with the three columns 73 as described above.

Each of the three columns 73 has a first member 731 provided on the tab receiving frame 71 in the upright state, and a second member 732 jointed to the hopper 74.

The first member 731 is a column-like member comprising a square steel pipe with a seat plate 733 provided at a lower edge thereof and is jointed to the tab receiving frame 71 with the seat plate 733. An upper edge face of the first member 731 is cut diagonally and is shielded with a receiving plate section 734.

Also the second member 732 comprises a square steel pipe with a mounting plate section 735 provided on a lower edge face thereof, and is mounted on and jointed with a bolt nut or the like to the receiving plate section 734 of the first member 731.

As described above, the hopper 74 is supported with the three columns 73, so that the hopper 74 is not engaged with the rotary tab 72 and provided in the state where the hopper 74 surrounds the rotary tab 72.

Figure 22:
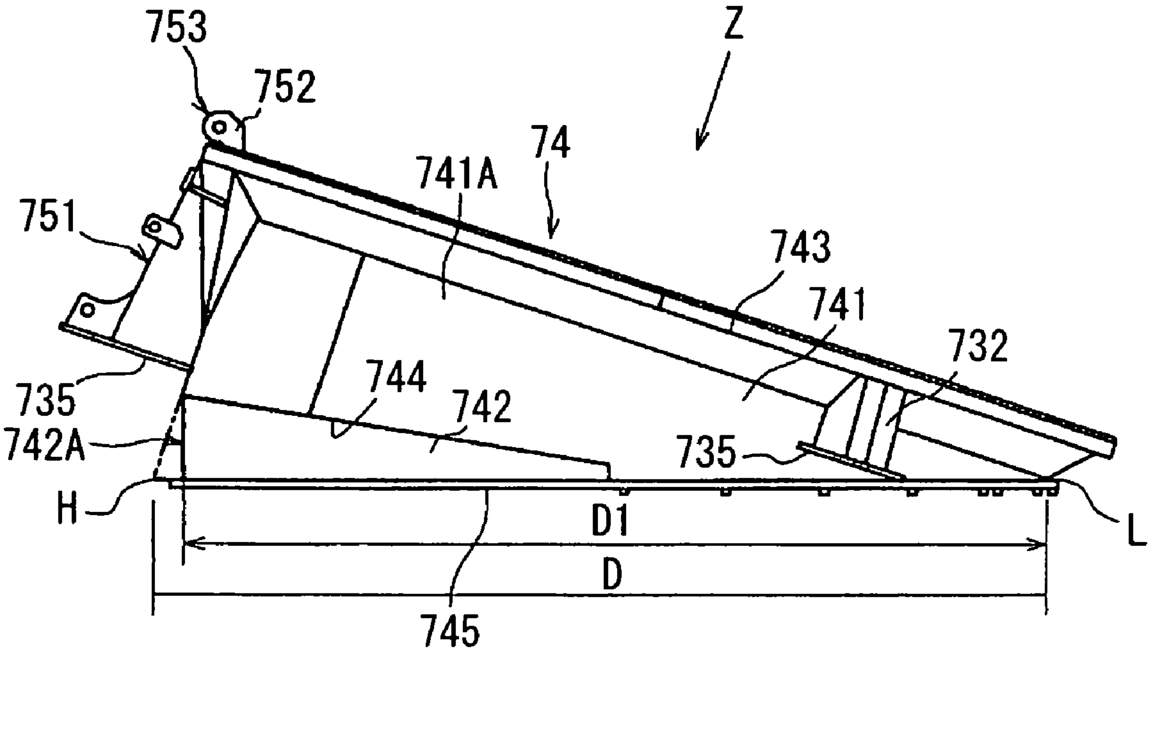
FIG. 22 is a front view showing the hopper in the embodiment.

The hopper 74 comprises, as shown in FIG. 21 and FIG. 22, a cylindrical body 741, a circular member 742 provided under and jointed to the cylindrical body 741, and a collar section 743 having a form like a funnel and provided at an upper rim of the cylindrical body 741.

The cylindrical body 741 is a cylindrical body with an upper edge thereof diagonally cut off and having the horizontal lower edge rim, and further a notched section 744 is formed on a lower rim of the portion having a large height. Because of this structure, a center line 01 of the cylindrical body 741 is inclined to a prespecified direction against the vertical axis with a prespecified angle, and a height of the peripheral wall 741A becomes gradually larger from the L portion to the H portion as shown in FIG. 22.

Figure 23:
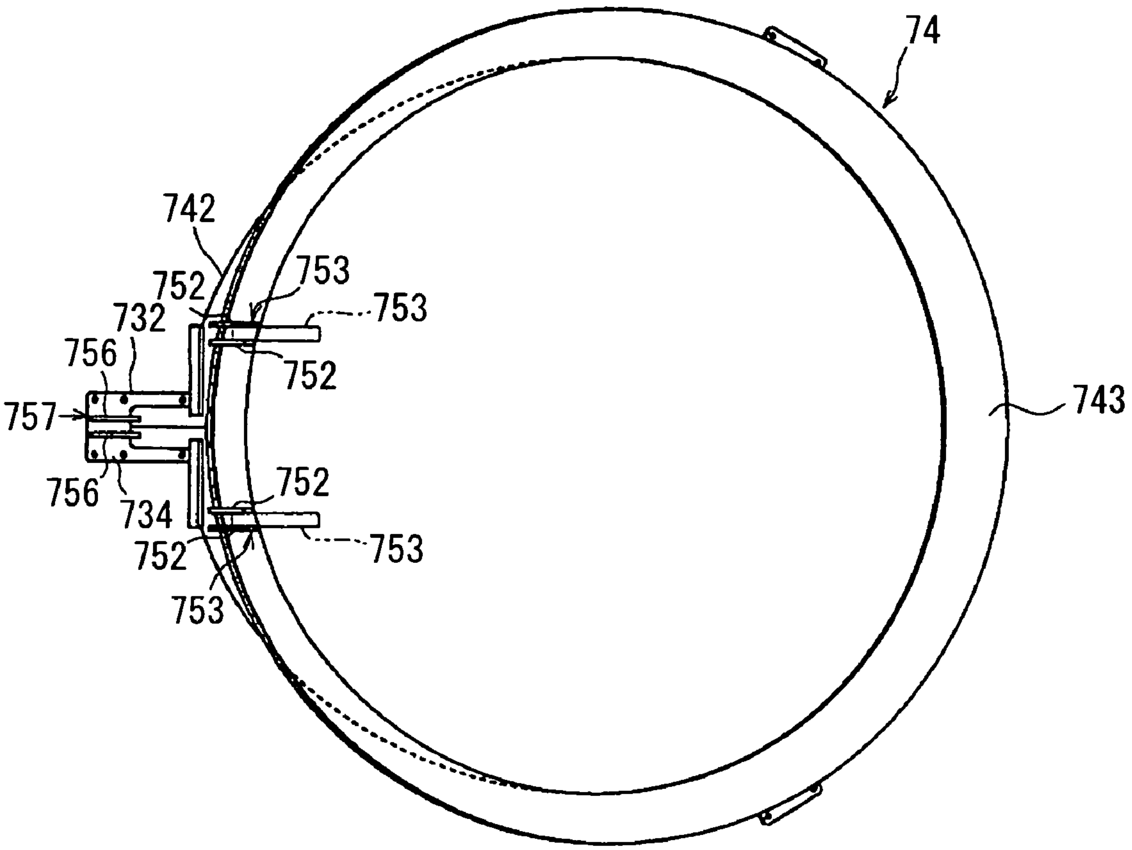
FIG. 23 is a plan view showing the hopper in the embodiment.

As shown in FIG. 22 and FIG. 23, the circular member 742 is a steel-made cylindrical body diagonally cut off and having a substantially triangular form when viewed from the side or a substantially semi-circular form when viewed from the top, and is engaged in a notched section 744 provided on a lower edge rim of the cylindrical body 741, and the external peripheral surface thereof extends along the vertical surface.

When the circular member 742 is not provided, the outer diameter of the lower edge of the hopper 74 is equal to D, but when the circular member 742 is provided, the outer diameter of the lower edge of the hopper 74 is D1 smaller than D, so that the outer diameter of the hopper 74 can be made smaller.

Figure 25:
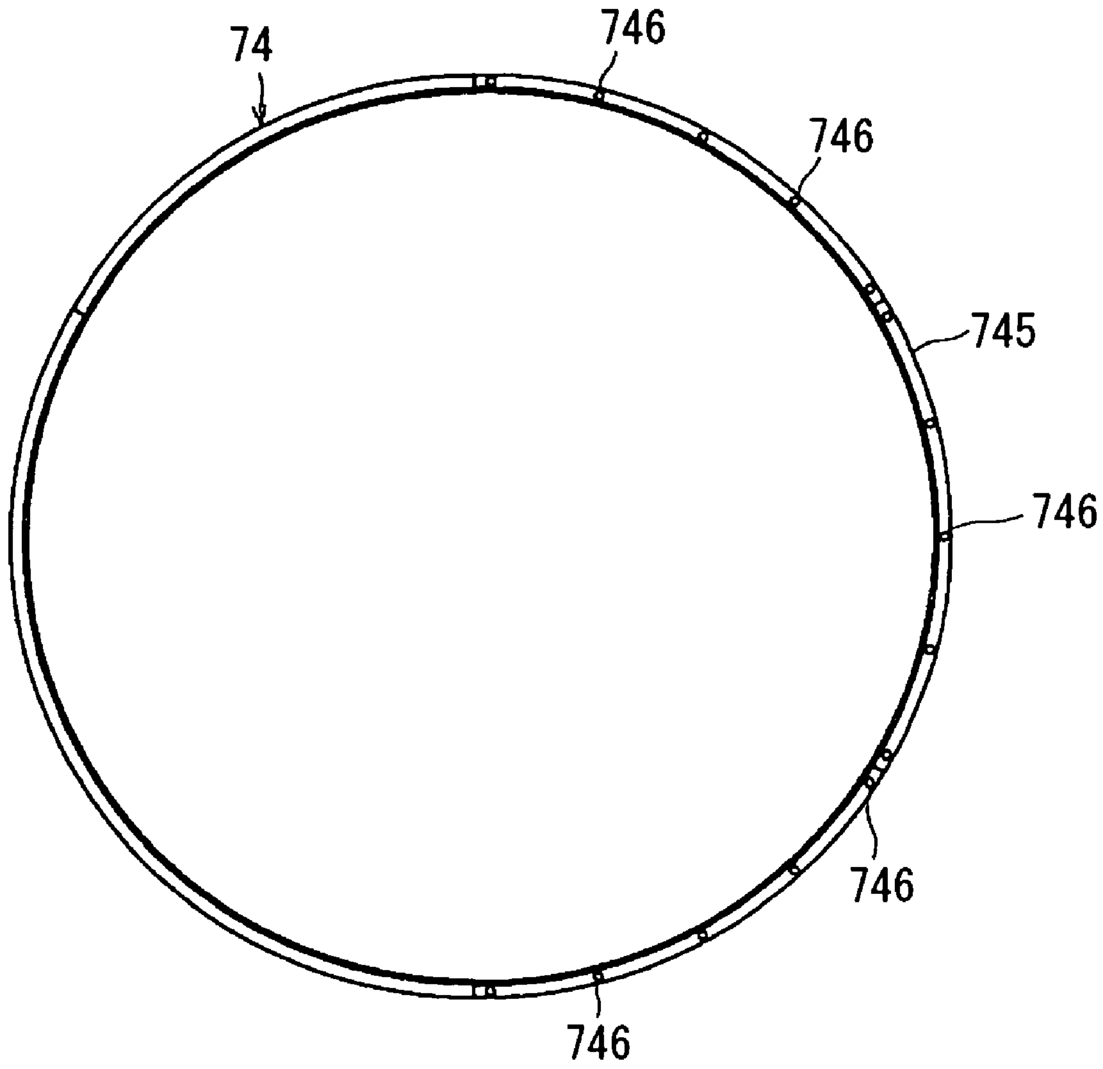
FIG. 25 is a bottom view showing the hopper in the embodiment.

The lower edge rim of the circular member 742 and the lower edge rim of the cylindrical body 741 (excluding the notched section 744) form a lower edge rim of this hopper 74, and as shown in FIG. 25, a ring-formed external collar section 745 is attached along the lower edge rim.

Figure 26:
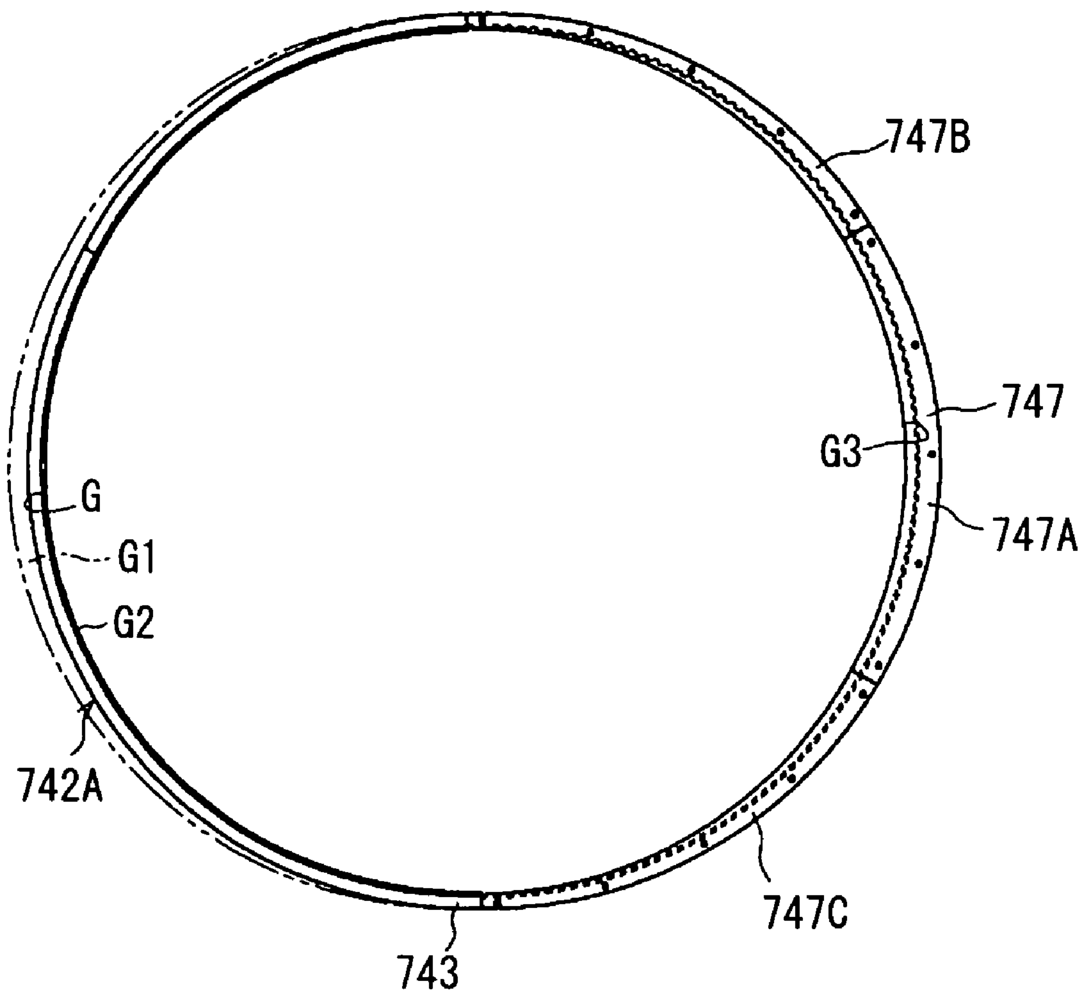
FIG. 26 is a cross-sectional view taken along the line V-V in FIG. 21.
Figure 27:
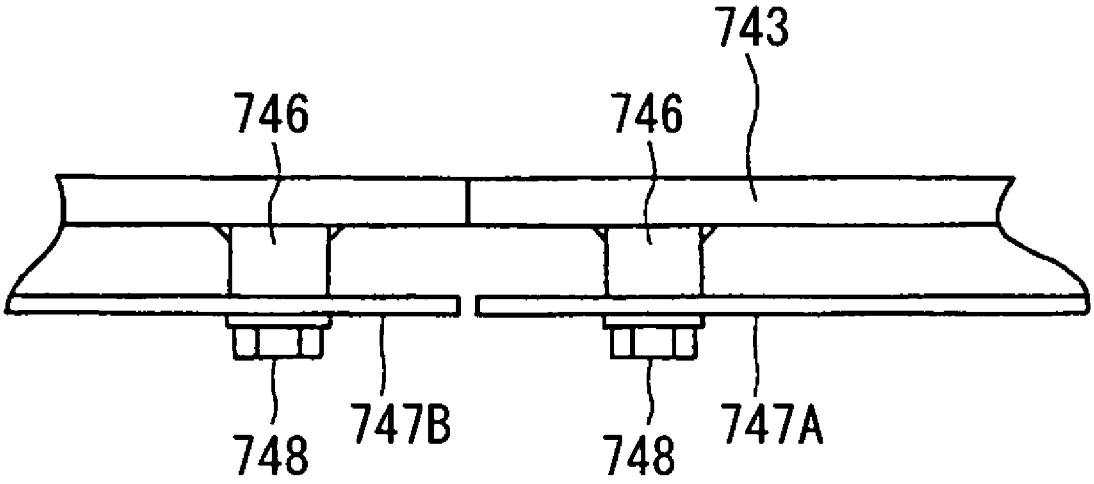
FIG. 27 is an enlarged cross-sectional view showing the mounting state of a cover member in the embodiment.

A plurality of nut members 746 are attached to this external collar section 745, and a covering member 747 as shown in FIG. 26 is attached to this nut member 746.

This covering member 747 comprises, as shown in FIG. 26, three flat plate bodies 747A, 747B, 747C, and each of the flat plate bodies 747A, 747B, 747C is attached to the collar section 743 of the hopper 74 by setting the bolt member 748 in the nut member 746 provided on the collar section 743.

When the hopper 74 having the structure as described above is attached and fixed to the column 73 provided on the tab receiving frame 71 in the upright state as shown in FIG. 21, the lower edge rim section of the hopper 74 is engaged in the idling state with the upper edge rim section of the rotary tab 72.

In the portion of the hopper 74 having a larger height, the circular member 742 is provided, and this circular member 742 surrounds the upper edge rim section of the rotary tab 72.

Because of this structure, as shown in FIG. 26, the clearance G formed between the upper edge rim section of the rotary tab 72 and the lower edge rim section of the hopper 74 can be made smaller, and therefore this circular member 742 can be called as a contracted section 742A in which the clearance G is reduced.

In other words, when the circular member 742 is not provided, as indicated by the virtual line in FIG. 26, the lower edge rim section in the portion of the hopper 74 having a large height is at the position indicated by the virtual line, so that the clearance G1 of this portion becomes larger.

In contrast, when the circular member 742 is provided, the clearance G1 corresponding to the clearance G2 becomes extremely smaller as indicated by the solid line.

Further in the contrary side from the clearance G2, namely in the portion having a small height, as the covering member 747 formed with the three flat plate bodies 747A, 747B, and 747C is attached to the collar section 743 of the hopper 74, so that the clearance G3 can be made smaller.

(4-5) Structure of the Scattering Prevention Cover 75

The scattering prevention cover 75 is provided as shown in FIG. 21 on the hopper 74. This scattering prevention cover 75 is supported so that the cover 75 can swing against the hopper 74 allowing for the closed state as shown with the solid line in FIG. 21 and the open state as shown with a virtual line in FIG. 21.

A cylinder mechanism 751 is used for swinging the scattering prevention cover 75.

In the portion of the hopper 74 having a large height, as shown in FIG. 22 and FIG. 23, a pair of support sections 753 each comprising a pair of support pieces 752 is provided in the collar section 743 of this hopper 74.

On the other hand, provided on the scattering prevention cover 75 are projecting piece sections 754 as shown in FIG. 21 and FIG. 23, and each of the projecting piece sections 754 is provided between the support pieces 752 in the support section 753, and is coupled via a support shaft 755 to the support section 753.

With this structure, the scattering prevention cover 75 can swing in the directions shown with the arrows a and β around the support shaft 755.

Figure 24:
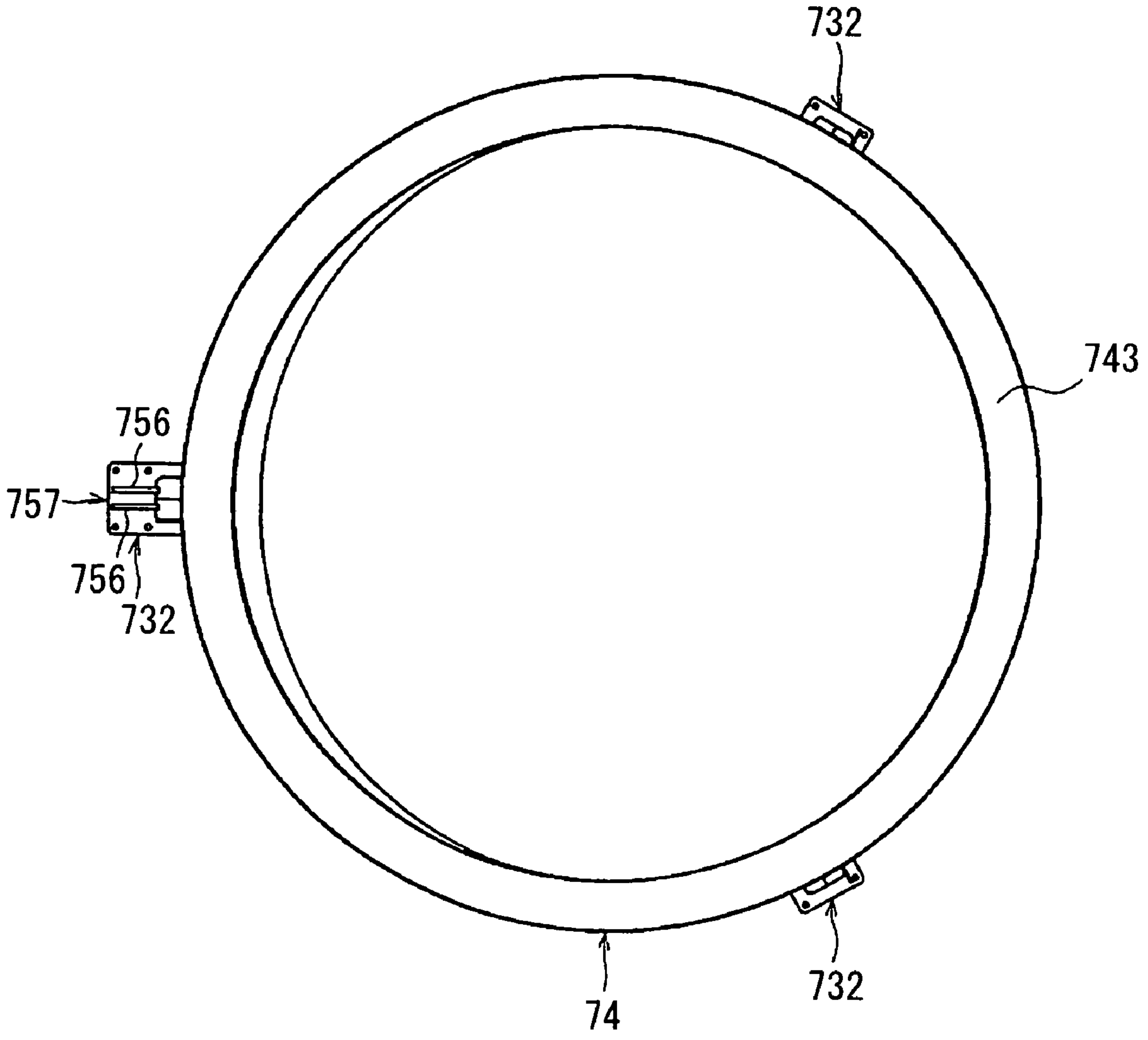
FIG. 24 is a view showing the state shown in FIG. 21 (translator's comment: "21" was a scribal error for "22") in the direction indicated by an arrow mark Z.

Provided on the mounting plate section 735 of the second member 732 of the column 73 in the large height portion of the hopper 74 is a support section 757 comprising a pair of support pieces 756 as shown in FIG. 22 to FIG. 24. Coupled to this support 757 is the support piece 751B of the cylinder body 751A in the cylinder mechanism 751 via a support shaft (not shown in the figures).

On the scattering prevention cover 75, the support piece section 758 is provided between the projecting piece sections 754 (Refer to FIG. 2), and a tip of a piston rod 751C of the cylinder mechanism 751 is pivotably coupled to this support piece section 88.

With this structure, when the piston rod 751C of the cylinder mechanism 751 is contracted from the state shown with the solid line in FIG. 21, the scattering prevention cover 75 swings in the direction indicated by the arrow β around the support shaft 755 and is set in the open state shown with the virtual line in the figure.

On the contrary, when the piston rod 751C of the cylinder mechanism 751 is extended from the open state shown with the virtual line, the scattering prevention cover 75 swings in the direction indicated by the arrow a around the support shaft 755 and is set in the closed state.

As described above, the hopper 74 has a charging opening 76 inclined against the horizontal surface, and further the scattering prevention cover 75 is provided over this charging opening 76 from an edge section of the charging opening 76 in the lateral direction of the vehicle body (Refer to FIG. 2) to the other edge section of the drive unit 5.

Because of the structure as described above, the movable wood crushing machine 1 according to this embodiment is restricted in regard to the wood charging direction, and therefore the direction in which the wood is charged is restricted in this movable wood crushing machine 1. Namely, in FIG. 2, the charging direction is to a corner formed with a left side face in the traveling direction and a rear surface of the cover 21.

Further as shown in FIG. 4, the tab motor 7A for driving the rotary mechanism 77 is positioned at a corner section contrary from that for charging wood.

[5] Structure of Swinging Mechanism 8

Figure 28:
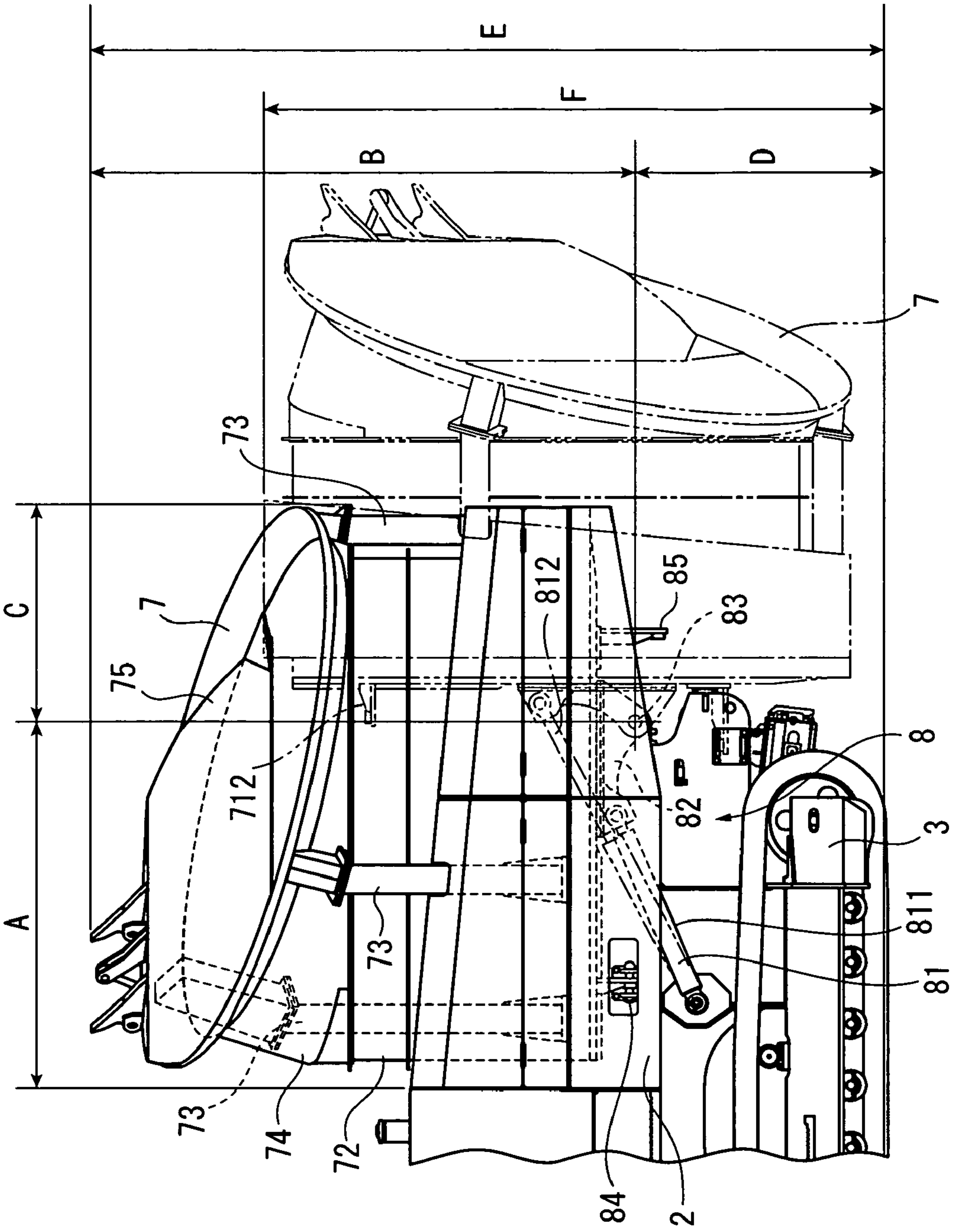
FIG. 28 is a side view showing a structure of a tab swinging mechanism in the embodiment.

The tab-type feeder 7 as described above is provided on the vehicle body 2 via the swinging mechanism 8, and when the swinging mechanism 8 is operated, the tab-type feeder 7 can take two postures, namely a posture for working shown with the solid line and a swinging posture shown with the virtual line as shown in FIG. 28.

Figure 29:
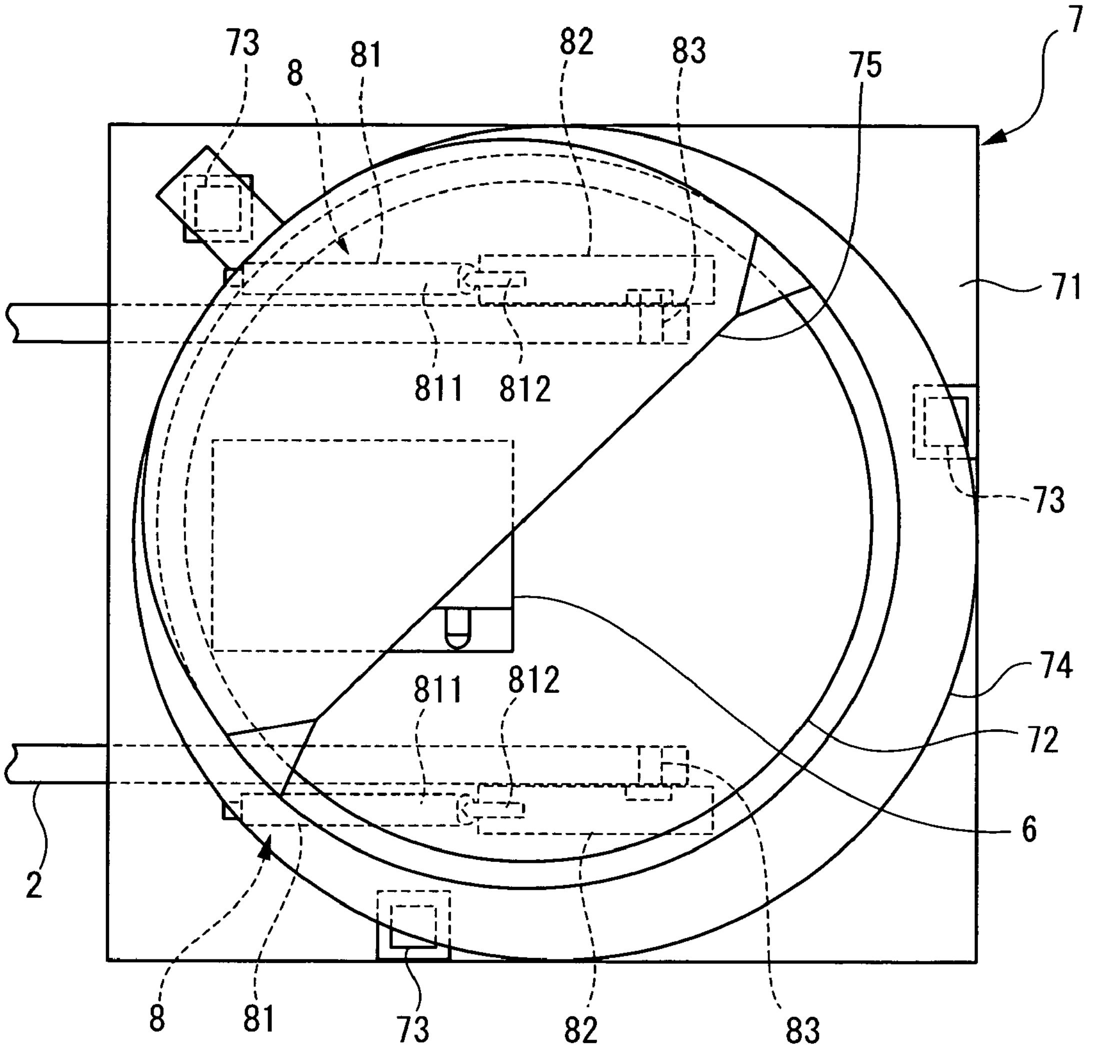
FIG. 29 is a plan view showing a structure of the tab swinging mechanism in the embodiment.
Figure 30:
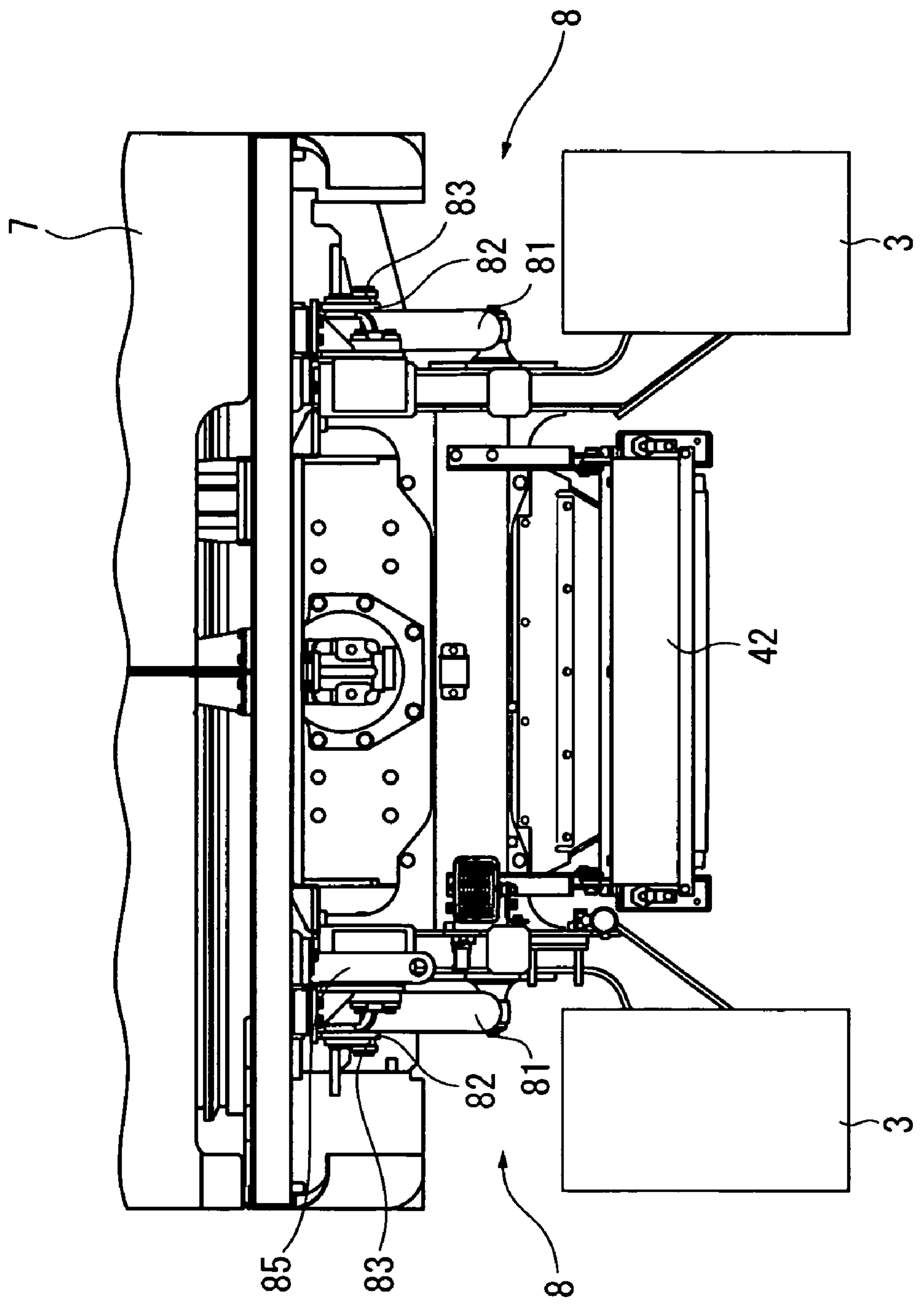
FIG. 30 is a rear view showing a structure of the tab swinging mechanism in the embodiment.

The swinging mechanisms 8 are provided at two positions along a side face of the vehicle body 2 as shown in FIG. 28 to FIG. 30, and each swinging mechanism 8 comprises a hydraulic cylinder 81, a bracket 82, a coupling shaft 83, a working posture stopper 84, and a swinging posture stopper 85.

As shown in FIG. 28 and FIG. 29, the hydraulic cylinder 81 comprises a cylinder body 811, and a piston rod 812 extending to and contracting from the cylinder body 811. A base section of the cylinder body 811 is rotatably supported under a side face of the vehicle body 2, and a tip section of the piston rod 812 is rotatably supported on the bracket 82.

Figure 31:
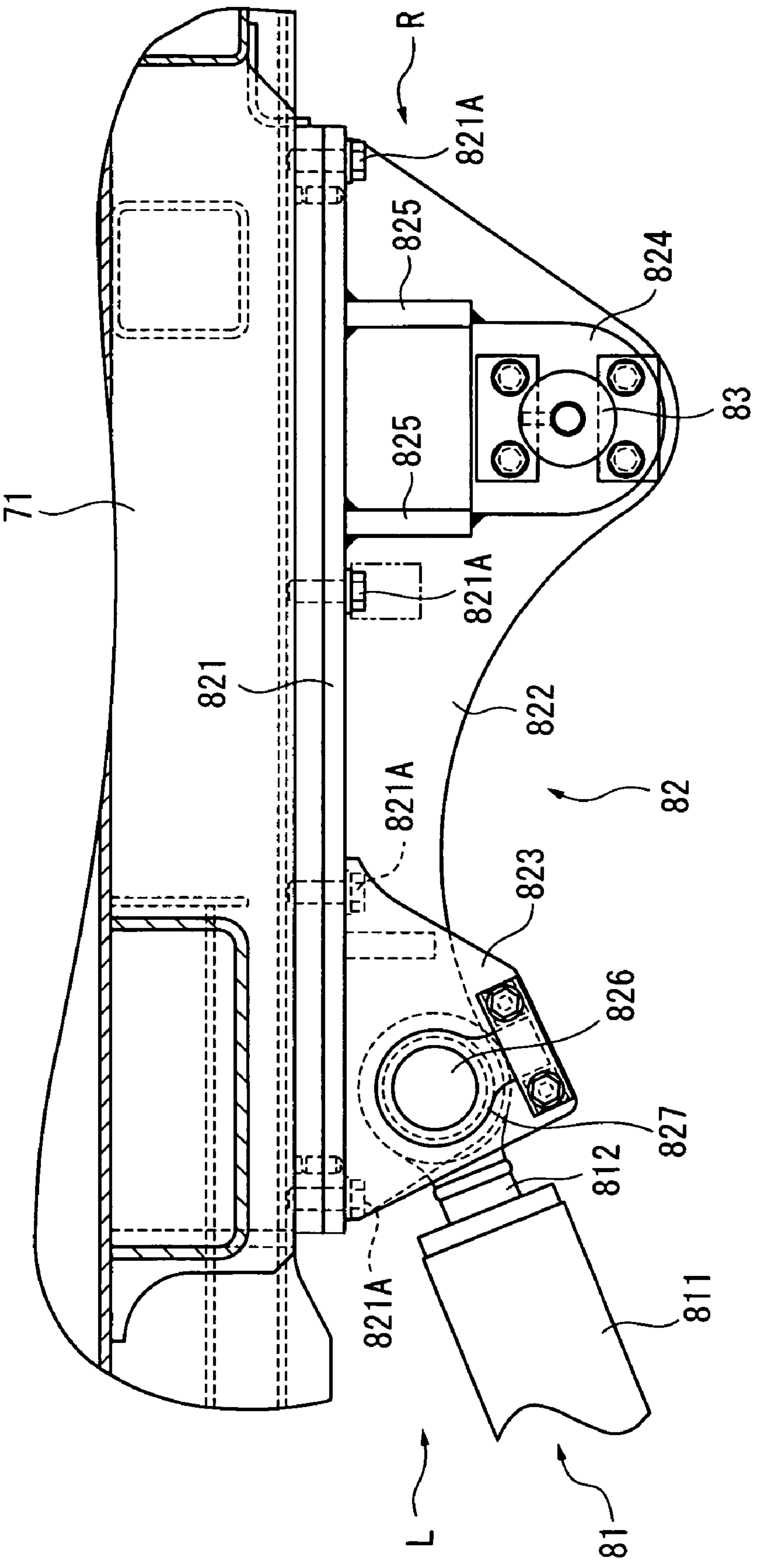
FIG. 31 is a side view showing a structure of a bracket constituting the tab swinging mechanism in the embodiment.
Figure 32:
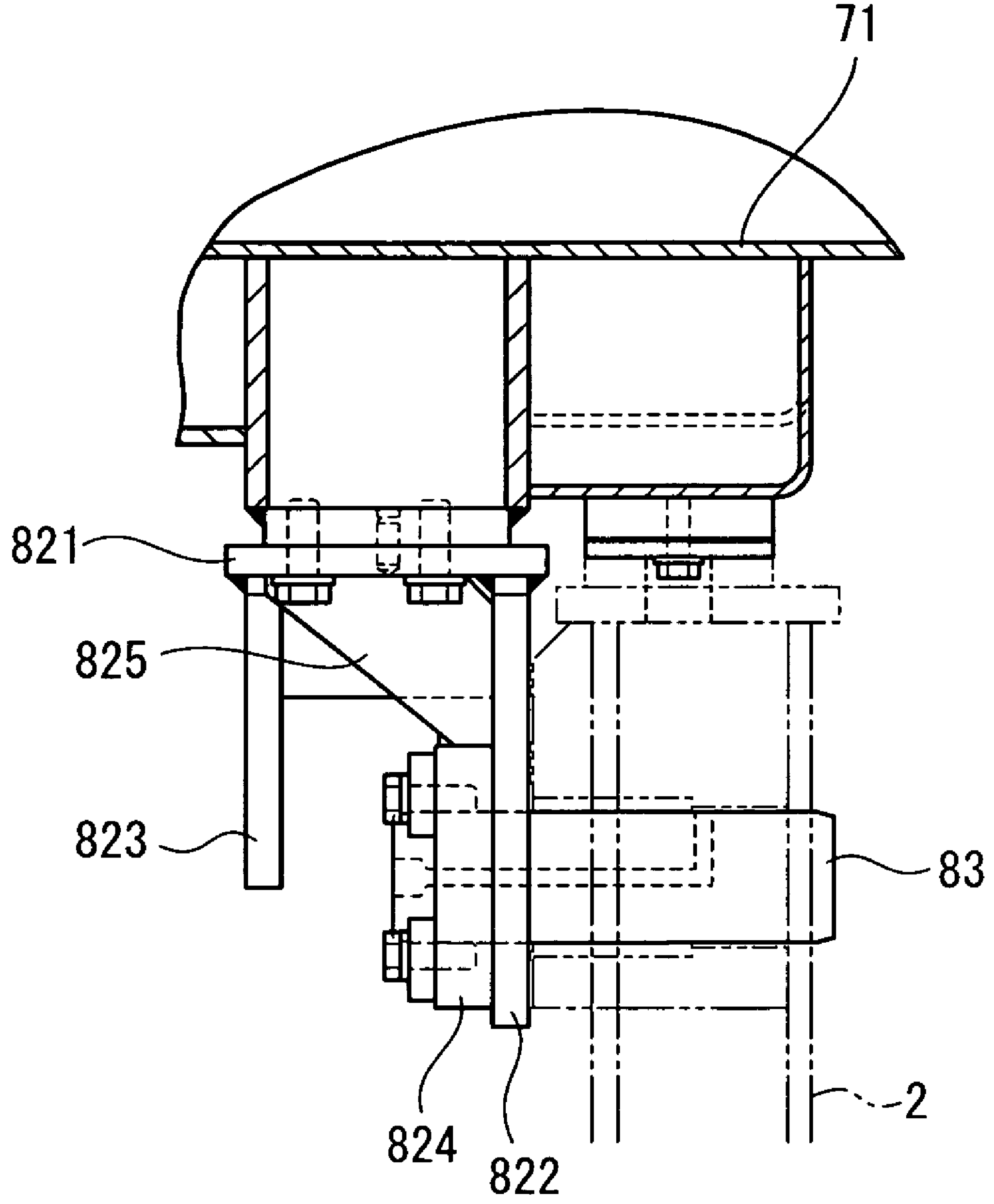
FIG. 32 is a view showing the state shown in FIG. 31 when viewed in the direction indicated by the arrow mark R.
Figure 33:
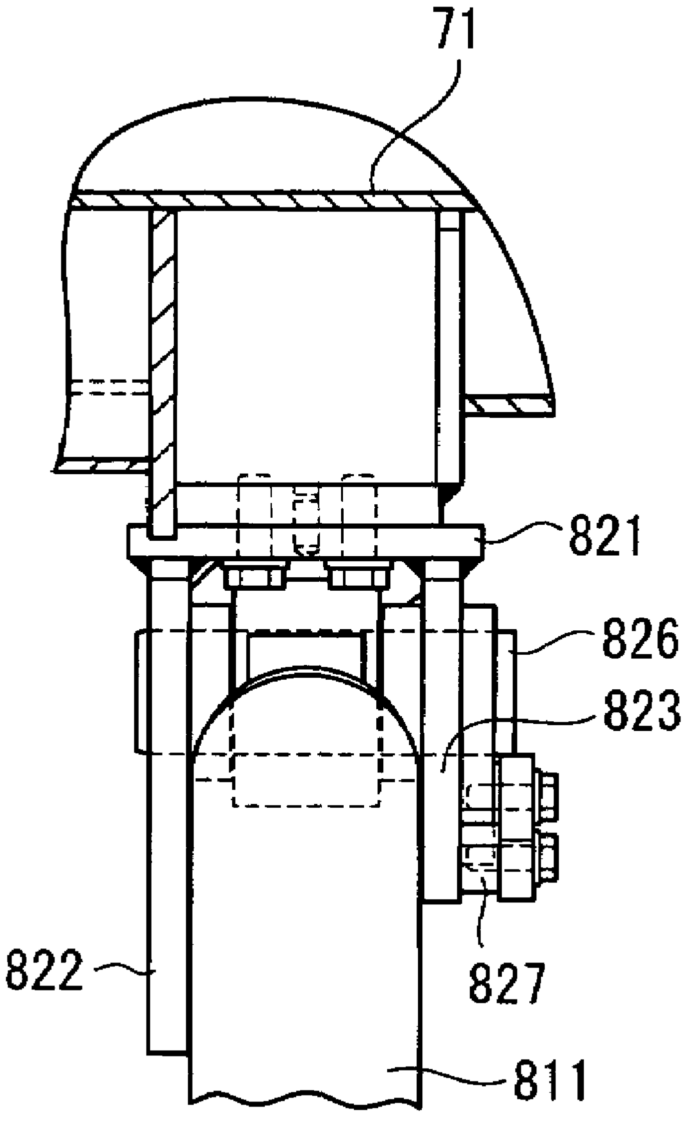
FIG. 33 is a view showing the state shown in FIG. 31 when viewed in the direction indicated by the arrow mark L.

The bracket 82 is a steel-made member comprising a bottom plate section 821, and side plate sections 822, 823 as shown in FIG. 31 to FIG. 33 and having a form like a horseshoe when viewed from the side in the traveling direction of the movable wood crushing machine 1.

The bottom plate section 821 is a portion fixed to the tab receiving frame 71 of the tab-type feeder 7, and is a rectangular plate body extending on the bottom surface of the tab receiving frame 71 along the traveling direction, and this bottom plate section 821 is screwed to the tab receiving frame 71 with a plurality of bolt plate sections 821A.

The side plate section 822 is a plate body hanging from an edge rim of the bottom plate section 821 in the side close to the vehicle body 2, and has the width equivalent to the length dimension along the traveling direction of the bottom plate section 821, and is jointed to the bottom plate section 821 by means of welding.

A rear portion of the side plate section 822 in the traveling direction extends in the vertical direction and has a reversely angled form, and a hole is formed in this reversely angled portion. A bearing 824 is provided in this hole, and the coupling shaft 83 is set in the bearing 824.

A pair of stiffeners 825 are provided above the position where the bearing 824 is provided, and each stiffener 825 is jointed to an edge face of the bearing 824, bottom plate section 821, and side plates 822 by means of welding.

A front portion of the side plate 822 in the traveling direction is a surface gradually included in the vertical direction as it goes forward, and a hole is formed at a position close to the front edge section. Inserted into this hole is a pin 826 for rotatably supporting a tip portion of the piston rod 812 of the hydraulic cylinder 81.

The side plate section 823 is a plate body jointed by welding to an outer edge rim of the bottom plate section 821 in the front side along the traveling direction of the bottom plate section 821, and a hole is formed on this side plate section 823 at a position corresponding to the hole in the front side of the side plate section 822. A bearing 827 is provided in this hole, and the pin 826 is set in this bearing 827.

The coupling shaft 83 is a steel-made pin having a form like a column, and is set in the bearing 824 provided on the side plate section 822 as described above with the tip section jointed to a steel frame portion of the vehicle body 2.

The working posture stopper 84 prevents generation of movement or the like against the vehicle body 2 when the tab-type feeder 7 is operating, and is provided on the side face of the vehicle body 2 at a position forward as compared to the bracket 82 as shown in FIG. 28. This working posture stopper 84 projects outward from the side face of the vehicle body 2, and has a pair of plate bodies each extending in the virtual direction, and buffer materials each comprising an elastic material are provided on opposing faces of the plate bodies.

On the other hand, provided on a bottom surface of the tab receiving frame 71 is a projection 712 protruding outward from the surface, and when the tab-type feeder 7 is set in the working posture, the projection 712 goes into a section between the two plate bodies and absorbs movement with the buffering materials.

The swinging posture stopper 85 is a plate body hanging toward a lower surface of the vehicle body 2 at the rear edge position, and a buffering material comprising an elastic member is provided on a surface of the stopper 85 contacting the tab-type feeder 7, and when the tab-type feeder 7 is swung by 90 degrees and set in the vertical posture, the surface contacts a bottom surface of the tab receiving frame 71.

With the swinging mechanism 8, the tab-type feeder 7 can swing by substantially 90 degrees to the rear section of the vehicle body 2 as indicated by the chain double-dashed line. More specifically, when the piston rod 812 of the hydraulic cylinder 81 described above is contracted, the tab-type feeder 7 is set in the working posture, and when the piston rod 812 of the hydraulic cylinder 81 is extended, the tab-type feeder 7 is set in the swinging posture, namely in the posture swung by 90 degrees.

The maximum height F from the ground of the tab-type feeder 7 in swinging is set to smaller value as compared to the maximum height E from the ground of the tab-type feeder 7 during working indicated by the solid line.

Swinging of the tab-type feeder 7 effected by the swinging mechanism 8 is performed when the rotary crushing device 6, rotary tab 72, or hopper 74 are checked, serviced, cleaned, or transported.

In FIG. 28, when the tab-type feeder 7 is set in the working posture as shown with the solid line, the horizontal direction A from a center of the coupling shaft 83 to a front side edge section of the tab-type feeder 7, namely to an edge section closer to the drive unit 5 is smaller than the vertical distance B from a center of the coupling shaft 83 to the highest portion of the tab-type feeder 7 (A<B). Further, when the tab-type feeder 7 is set in the working posture, the horizontal distance C from a center of the coupling shaft 83 to the rear side edge section of the tab-type feeder 7 is smaller than the vertical direction D from the center of the coupling shaft 83 to the surface of the travel device 3 contacting the ground (C<D).

Further the coupling shaft 83 is positioned so that, when the tab-type feeder 7 is swung by about 90 degrees backward as shown with the chain double-dashed line, the tab-type feeder 7 never interferes the travel device 3, and also so that swinging of the tab-type feeder 7 by a prespecified angle or more is prevented by the swinging posture stopper 85.

Therefore, when the tab-type feeder 7 is swung by about 90 degrees backward, the tab-type feeder 7 never interferes the ground surface, nor the travel device 3. The height F of the tab-type feeder 7 from the ground surface in the state is smaller than the height E (=B+D) of the tab-type feeder 7 in the working posture.

[6] Actions and Effects of the Movable Wood Crushing Machine 1

Actions and effects of the movable wood crushing machine 1 having the structure as described above is described below.

(6-1) Actions of the Movable Wood Crushing Machine 1

Figure 34:
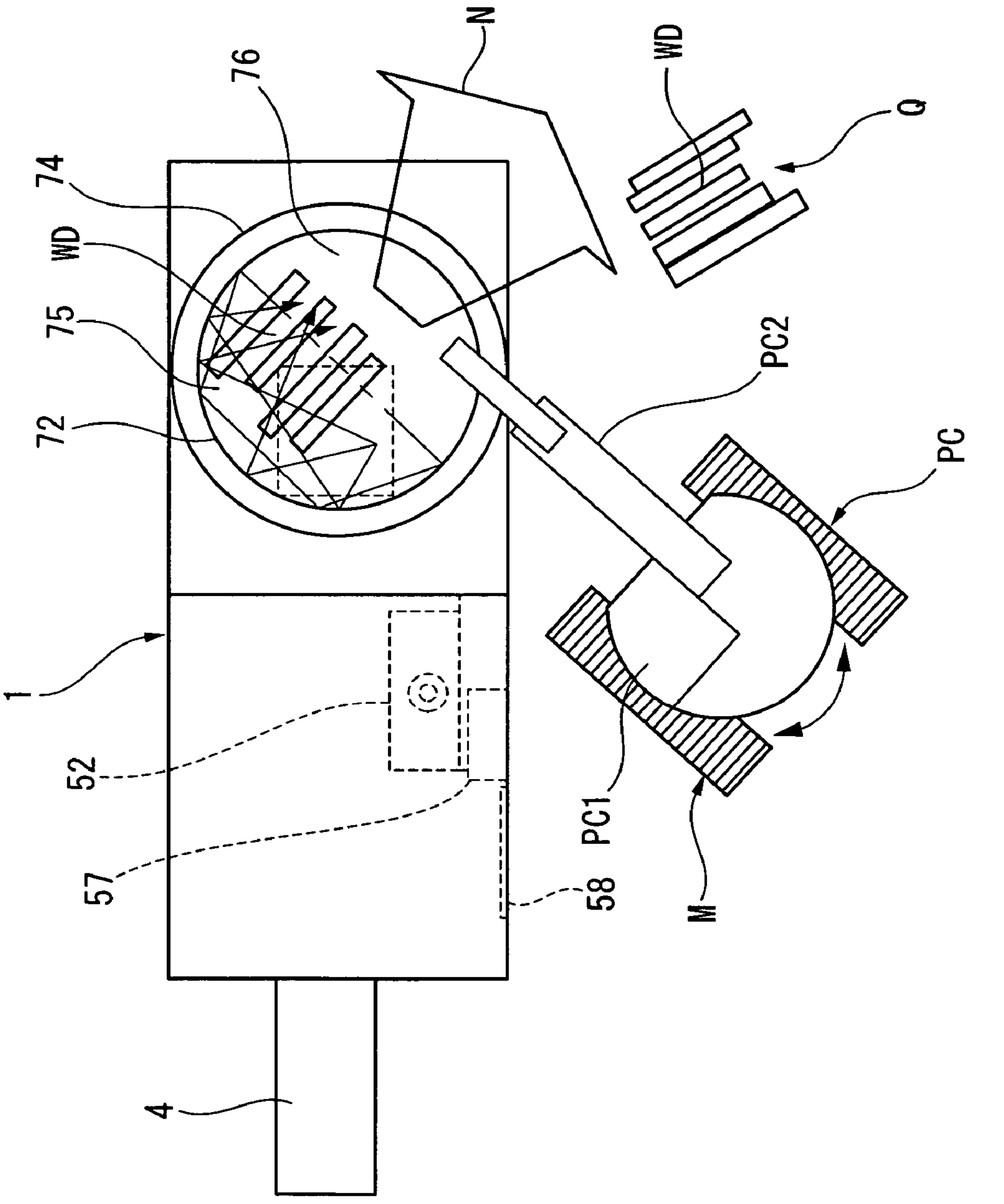
FIG. 34 is a schematic view for illustrating actions of the movable wood crushing machine according to the embodiment.

As shown in FIG. 34, a loader PC is positioned at a position M in the left side and forward from the movable wood crushing machine 1 and offset from the direction N in which wood pieces spring out from the scattering prevention cover 75, in other words in the left side of a central portion of the vehicle.

Wood to be crushed WD is stocked at a position Q where the wood to be crushed WD can be loaded into the hopper 74 by turning the loader PC in the counterclockwise. This loader PC has an operator's chamber PC1 in the left side of the front section of an upper swirling body and a working machine PC2 for loading the wood to be crushed in the right side from this operator's chamber PC1.

The wood to be crushed WD is picked up by the loader PC at the stock yard and loaded on the scattering prevention cover 75 of the hopper 74. Then the wood to be crushed WD slips down along the scattering prevention cover 75 and are charged from the charging opening 76 not covered with the scattering prevention cover 75 into the rotary tab 72.

The wood to be crushed WD stocked due to rotation of the rotary tab 72 therein is fed to the rotary crushing device 6 and is crushed by the bits 625 attached to an external peripheral section of the rotary crushing device 6 into small wood chips.

Of the crushed wood pieces, those each having the size smaller than a hole of the screen member 63 pass through the screen member 63 and drop onto the conveyer 4 and are discharged forward to outside of the vehicle body. Wood chips each having the size larger than the hole of the screen member 63 are further crushed by the rotary crushing device 6 between the rotary crushing device 6 and the screen member 63 and then drop from the screen member 63 onto the conveyer 4.

(6-2) Effects Provided by Layout of the Movable Wood Crushing Machine 1

Figure 35:
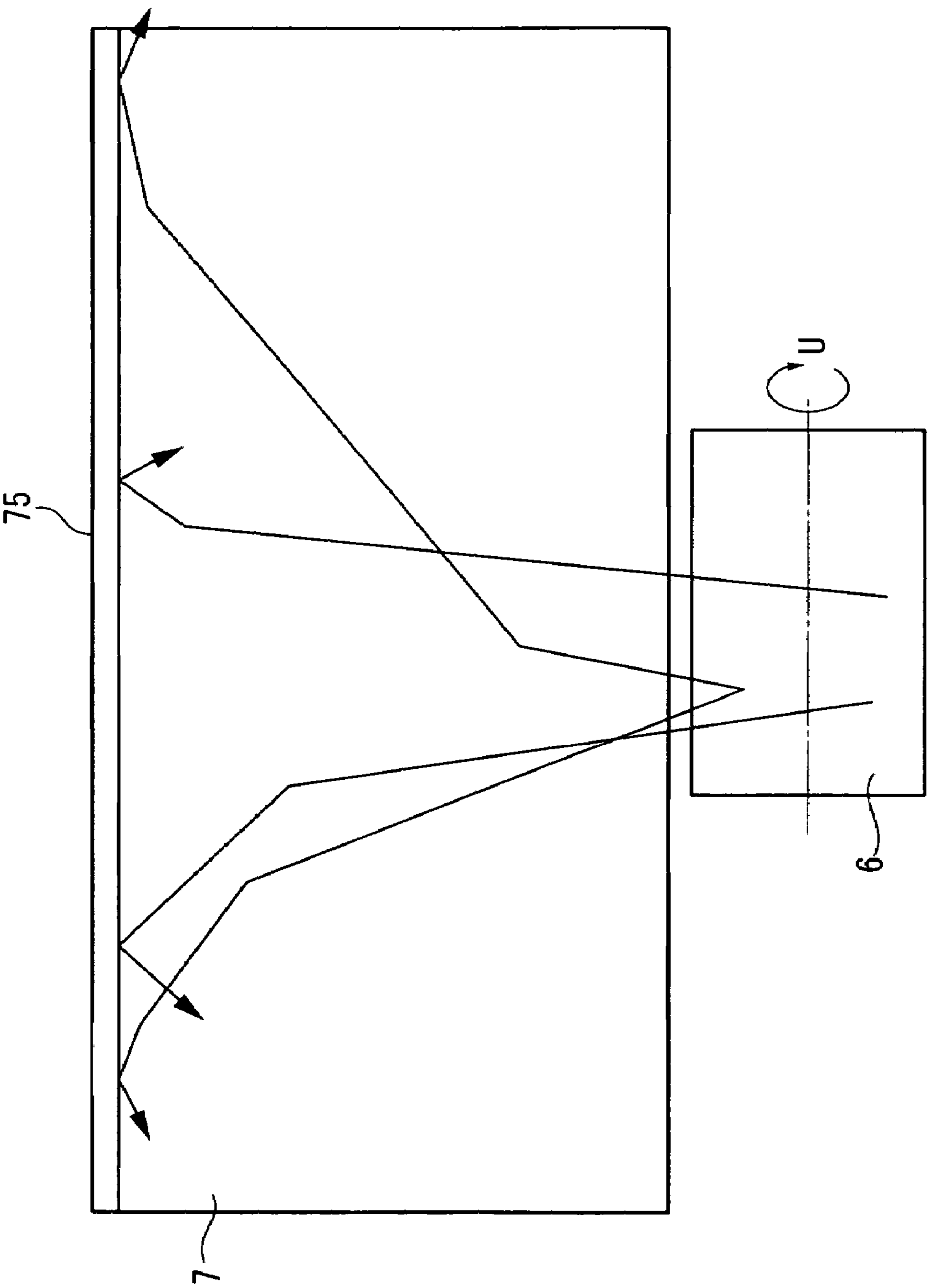
FIG. 35 is a schematic view for illustrating reflection of crushed matters by the scattering prevention cover in the embodiment.

Of the crushed wood pieces, a portion of those each having the size larger than the hole of the screen member 63 spring out upward of the rotary crushing device 6 from a section between the rotary crushing device 6 and the screen member 63 due to a torque generated by the rotary crushing device 6 and scatter to the internal wall surface of the tab-type feeder 7 as shown in FIG. 34 and FIG. 35. Also a portion of wood to be crushed not having been crushed and with smaller size scatters toward the internal wall surface of the tab-type feeder 7 similarly.

FIG. 35 is a view showing the state where an internal surface of the tab-type feeder 7 is developed to the peripheral direction for illustrating reflection of the crushed wood pieces by the scattering prevention cover 75.

Most of the scattered pieces fly along the rotating direction U of the rotary crushing device 6, collide the internal wall surface of the tab-type feeder 7, and are reflected thereby, or collide the internal wall surface of the tab-type feeder 7 several times and then are reflected on the internal face of the scattering prevention cover 75, and drop into the tab-type feeder 7, but a portion of the wood pieces spring out from the charging opening 76 not covered with the scattering prevention cover 75.

In this step, those reflected at higher positions of the tab-type feeder 7 scatter over a short distance and collide the internal face of the scattering prevention cover 75, while those reflected at lower positions of the tab-type feeder 7 fly over a long distance, and then are reflected again at higher positions of the tab-type feeder 7, and collide the internal face of the scattering prevention cover 75.

Because of the features as described above, most of the scattered pieces are reflected by the scattering prevention cover 75 and do not spring out of the tab-type feeder 7. Only a few portion of the pieces is not prevented from springing out and scatters from the charging opening 76 not covered with the scattering prevention cover 75 in the direction as indicated by the white arrow in FIG. 34 springing out of the tab-type feeder 7.

As described above, the tab-type feeder 7 and conveyer 4 are separated from each other and provided in the opposite sides of the vehicle body in the longitudinal direction, so that crushed matters not having been screened according to the size by the screen member 63 or wood to be crushed WD not having been crushed scattering and springing out of the charging opening 76 of the tab-type feeder 7 is never mixed in the crushed wood pieces having been screened according to the size on the conveyer 4, which makes it possible to uniform size of the wood pieces discharged by the conveyer 4 as a product.

In the step of charging the wood to be crushed WD with the loader PC into the hopper 74, uncontrolled wood to be crushed WD never drops onto the conveyer 4, which ensures improvement in the product quality.

When the loader PC loads the wood into the hopper 74, interference to the conveyer 4 never occurs, which enables increase of a freedom in a direction of loading with the loader PC and improvement of efficiency in the loading work.

As the charging opening 76 of the hopper 74 to be visually checked during the loading work, monitor display units in the operation panel 57, and the net 58 for an externally mounted cover provided in the upstream side from the cooling fan to be checked are positioned in one side of the vehicle body, an operator in the operator's chamber PC1 of the loader PC can easily and visually recognize and check the situation during the loading work, which ensures the very high work efficiency.

Further as the fuel tank 52 is positioned in the same side as that in which the operation panels 57 and the components are provided, even if the movable wood crushing machine 1 is positioned with the other side contrary from the side described above in the lateral direction of the vehicle body oriented toward a hardly accessible place such as a wall of the site or the like, access, visual recognition, and checking can easily be carried out from the side where the above-described components placed, so that a place for installment of a wood crushing machine can flexibly be selected at a working site.

(6-3) Effects Provided by Prevention of Scattering

Figure 36:
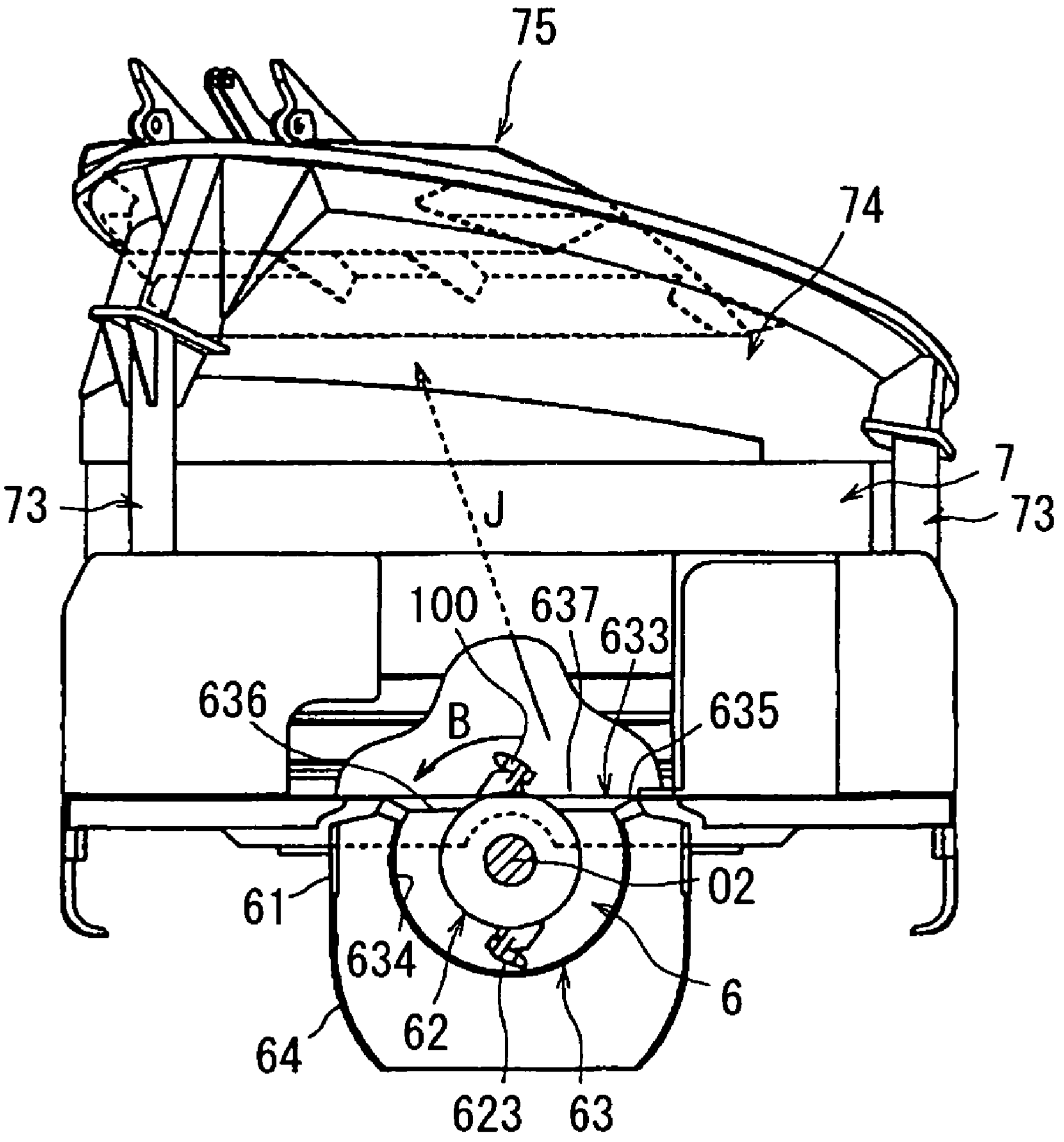
FIG. 36 is a schematic view for illustrating scattering directions when crushed matters are scattered from the rotary crushing device in the embodiment.

As shown in FIG. 36, crushed matters not discharged downward via the screen member 63 scatter via the discharge side opening 637 into the tab-type feeder 7. In this step, the crushed matters scattering into the tab-type feeder 7 in association with rotation of a rotary drum 622 scatter substantially upward, but as an opening edge rim section 635 of the screen member 63 is positioned at a level higher than a rotation center O2 of the rotary crusher 62, the position is displaced from the clearance G between the hopper 74 and the rotary tab 72, so that the matters scatter in a direction deflected from a position just above the rotary crusher 62 as indicated by the arrow J in FIG. 36 from the discharge side opening 637 toward the scattering prevention cover 75.

The top side of the charging opening 76 of the tab receiving frame 71 is open, so that, even when crushed matters scatter from inside the rotary crushing device 6, there is no member preventing scattering of the matters, which prevents the crushed matters from being stocked at an outlet port in the side where the crushed matters scatter.

Because of this structure, an excessive load is never loaded to the mill motor 6A for rotating the rotary crusher 62, which prevents slow rotation or stop of rotation of the mill motor 6A, and therefore operation down can be evaded. Further, clogging of crushed matters seldom occurs, so that a frequency of the work for removing the crushed matters can be reduced.

Further wood fed into the tab-type feeder 7 is prevented from being hung up or held by components and is smoothly guided into the rotary crushing device 6. Because of this feature, an excessive load is never applied to the tab motor 7A for rotating the tab-type feeder 7, which prevents slow rotation or stop of rotation of the tab motor 7A, and therefore operation down is evaded.

As described above, the operating life of each of the motors 6A, 7A can be prolonged, which makes it possible to carrying out the crushing work for a long period of time with the work efficiency improved, and in addition the convenience in a maintenance work for the motors 6A, 7A and other related components can be improved.

The crushed matters scattered from the rotary crushing device 6 positioned at a low position collide the scattering prevention cover 75 and drop downward, so that the crushed matters are prevented from flowing out from a clearance (positioned diagonally above the crushed pieces) between the hopper 74 and the rotary tab 72. Because of this feature, contamination of the outer side of the machine with the crushed matters can be reduced, and the rotary crushing device can easily be washed or cleaned after a crushing work is finished, so that convenience in maintenance for the machine can be improved.

The crushed matters not discharged downward via the screen member 63 scatter from the clearance 634 substantially upward, but the opening edge rim section 635 of the screen member 63 is positioned at a higher level than the rotation center O2 of the rotary crusher 62, and the position is displaced from the clearance G between the hopper 74 and the rotary tab 72, so that the crushed matters scatter in a direction offset from the vertical axial line of the rotary crusher 62.

Because of this feature, the scattering prevention cover 75 for preventing the crushed matters from scattering to the outside is required only to receive those scattering along the direction described above, so that the size of the cover 75 may be relatively small, and the charging opening 76, which is an upper opening of the hopper 74, can be made larger. Because of this structure, the efficiency in loading wood into the hopper 74 can be improved.

(6-2) Effects of the Tab-Type Feeder 7

The hopper 74 has a contracting section 742A for contracting the clearance G between an upper edge rim section of the rotary tab 72 and a lower edge rim section of the hopper 74, so that the clearance G between an upper edge rim section of the rotary tab 72 and a lower edge rim section of the hopper 74 can be reduced, and as a result, a quantity of crushed materials flooding or scattering from this clearance G can be reduced.

Because of this feature, contamination of the outside of the machine with the crushed matters can further be reduced, and the crushing machine can easily be washed and cleaned after completion of a crushing work with the convenience in maintenance further improved.

As the contracting section 742A is provided, the outer dimension of this contracting section 742A can be made smaller, so that the outer dimension of the entire hopper when viewed from the top can be made smaller.

Namely, different from the wood crushing machine based on the conventional technology, with the present invention, only the outer dimension of the contracting section can be made smaller, while the diameters of other portions can be made larger within the restrictions for transportation.

Because of this feature, a diameter of the rotary tab 72 and a hole diameter of the charging opening 76 of the hopper 74 can be made larger, so that the wood loading area can be enlarged with the convenience in the loading work improved.

In the small height portion of the hopper 74, a quantity of crushed materials flooding (scattering) to the outside is small, and there is no need for providing the contracting section 742A, so that the height of the entire hopper 74 can be suppressed to a smaller value. With this feature, for instance, even if this wood crushing machine is self-propelled, restriction over the height thereof can be evaded.

When the contracting section 742A is provided, it is necessary to connect components each constituting the contracting section 742A by welding or the like, and therefore as compared to the case in which the contracting section 742A is provided along the entire periphery, the wood crushing machine according to the present invention can be produced with improved efficiency and lower cost as compared to that based on the conventional technology.

As the contracting section 742A is provided in the large height portion of the hopper 74, the clearance G between an upper edge rim section of the rotary tab 72 and a lower edge rim section of the hopper 74 can be reduced in the large height portion of the hopper 74, and further the clearance G in the small height portion of the hopper 74 can be made smaller.

Because of this feature, the entire clearance formed along the entire outer periphery of the upper edge rim section of the rotary tab 72 can be made smaller, so that a quantity of crushed materials flooding (scattering) from the clearance G can be reduced with the reliability improved.

Namely the quantity of crushed materials flooding (scattering) from the clearance G formed along the entire outer periphery of the upper edge rim section of the rotary tab 72 can further be reduced. Because of this feature, contamination of the wood crushing machine with crushed materials can substantially be reduced to an extremely low level.

As the chain 775 provided along the entire periphery of the tab body 721 of the rotary tab 72 engages with the sprocket 724 provided in the tab body 721 of the rotary tab 72, the torque can securely be delivered to the rotary tab 72 via the chain 775. Further as travel of the chain 775 is guided by the guide member 725 provided in the rotary tab 72, the chain 775 can travel in the stable condition, which stabilizes rotation of the rotary tab 72.

Because of this feature, wood can securely be supplied to the rotary crushing device 6 provided under the rotary tab 72, which enables a crushing work with high efficiency.

As the guide member 725 is provided on an external peripheral surface of the rotary tab 72, the solidity of the rotary tab 72 is improved, which enables realization of the tab-type feeder 7 with excellent durability.

Further, it is not necessary to provide the sprocket 724 along the entire periphery of the external peripheral surface of the rotary tab 72, so that further cost reduction is possible as compared to the case in which the sprocket is provided along the entire periphery.

The chain 775 can substantially maintain with the guide member 725 the pitch circle P formed between with a plurality of sprockets 724, so that the chain 775 smoothly runs and an overload to the chain 775 can be prevented.

Because of the feature, the chain 775 smoothly runs with an overload to the chain 775 prevented. Therefore, an operating life of the chain 775 is prolonged, and a crushing work can be performed for a long period of time in the stable condition.

The guide member 725 is engaged in a section between the pin link 775A and a roller link 775B opposite to each other on the chain 775, so that engagement of the chain 775 with the sprocket 724 can further be tightened. Namely, the engagement efficiency of the chain 775 is improved and the chain 775 smoothly engages with the sprocket 724, which prevents the chain 775 or sprocket 724 from being broken or damaged.

The tab motor 7A for driving the rotary mechanism 77 is provided at a position offset from a position just below a place where wood passes over when wood being charged, so that such troubles as drop of charged wood onto the tab motor 7A can be prevented.

Because of this structure, driving of the tab motor 7A or the like can be prevented from being hampered, which ensures stable rotation of the rotary tab 72 and protects the tab motor 7A and the like with the operating life of the rotary mechanism 77 prolonged.

The charging opening 76 of the hopper 74 is inclined against the horizontal direction for restricting a direction in which wood is charged, so that the work for charging wood is stabilized with the work efficiency improved.

(6-4) Effects of the Swinging Mechanism 8

Figure 37:
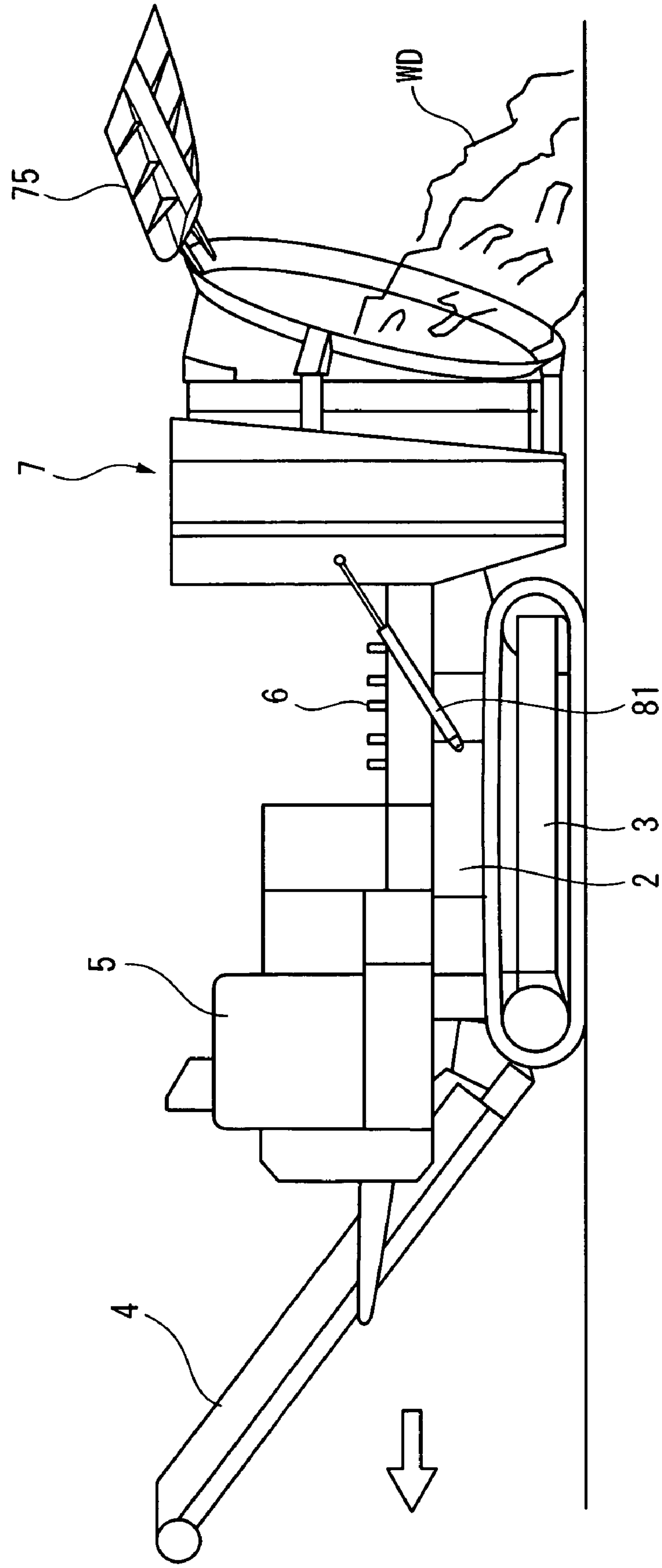
FIG. 37 is a schematic view for illustrating actions of the swinging mechanism in the embodiment.

As the movable wood crushing machine 1 has the swinging mechanism 8, when the scattering prevention cover 75 is opened as shown in FIG. 37 and the tab-type feeder 7 is swung in the backward direction of the vehicle body 2 for cleaning inside of the tab-type feeder 7, if the wood to be crushed WD overflows from the inside, the tab-type feeder 7 can smoothly be removed without loading an unnecessarily large force by traveling the vehicle frontward, so that the work for carrying out wood remaining inside the tab-type feeder 7 can easily be performed.

Such works as checking, maintenance, and cleaning for the rotary crushing device 6 and tab-type feeder 7 can be performed from either side of the vehicle.

Figure 38:
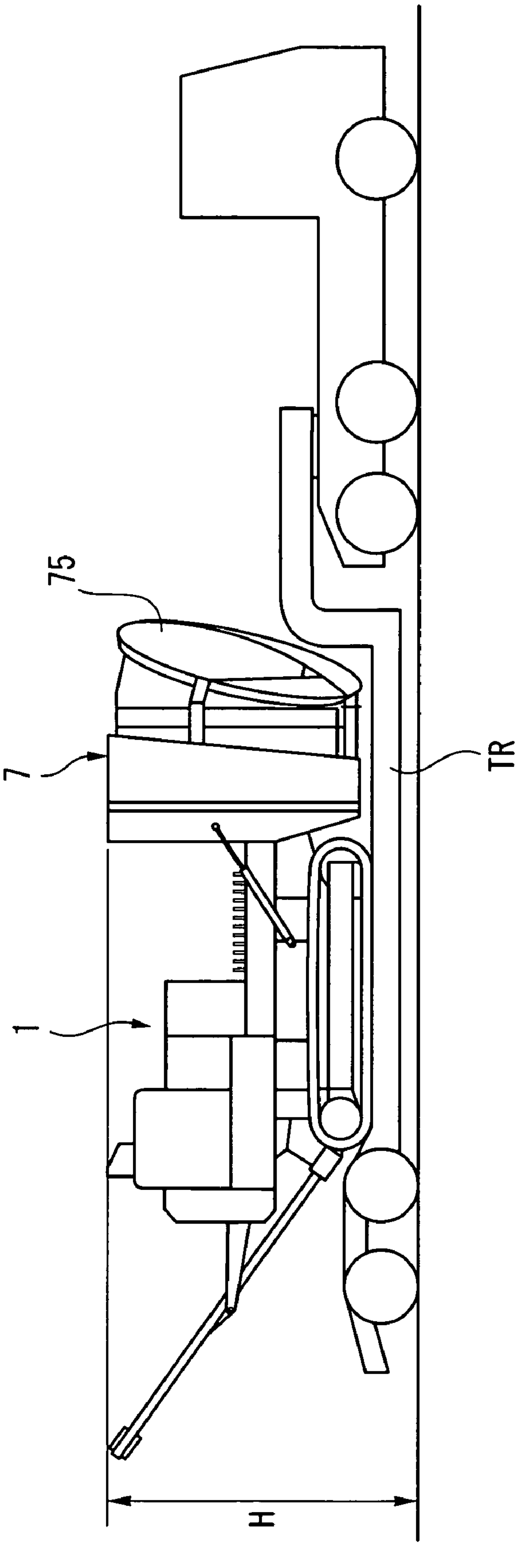
FIG. 38 is a schematic view for illustrating actions of the swinging mechanism in the embodiment.
Figure 39:
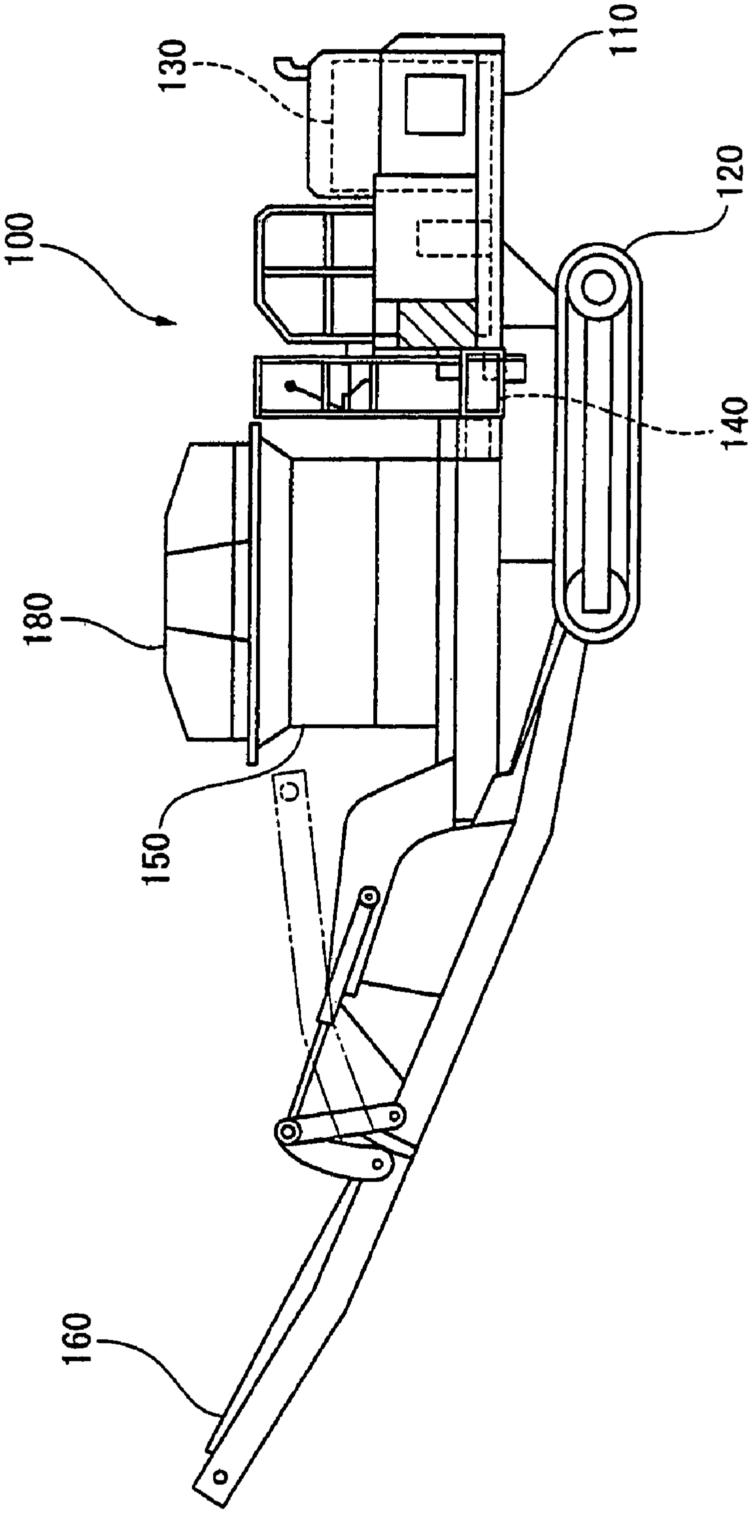
FIG. 39 Prior Art
FIG. 39 is a side view showing a structure of a movable wood crushing machine based on the conventional technology.
Figure 40:
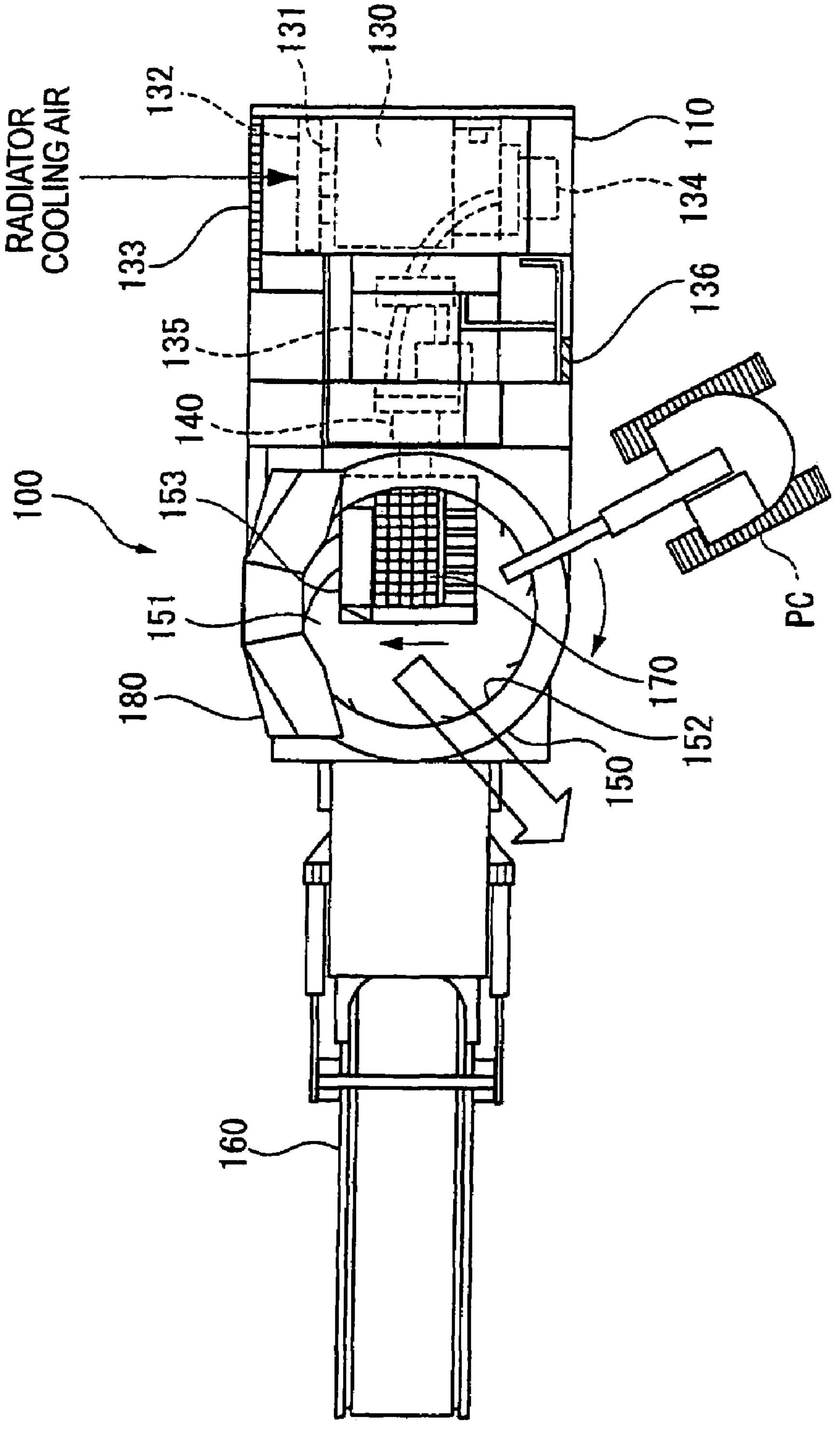
FIG. 40 Prior Art
FIG. 40 is a schematic view for illustrating actions of the movable wood crushing machine based on the conventional technology.
Figure 41:
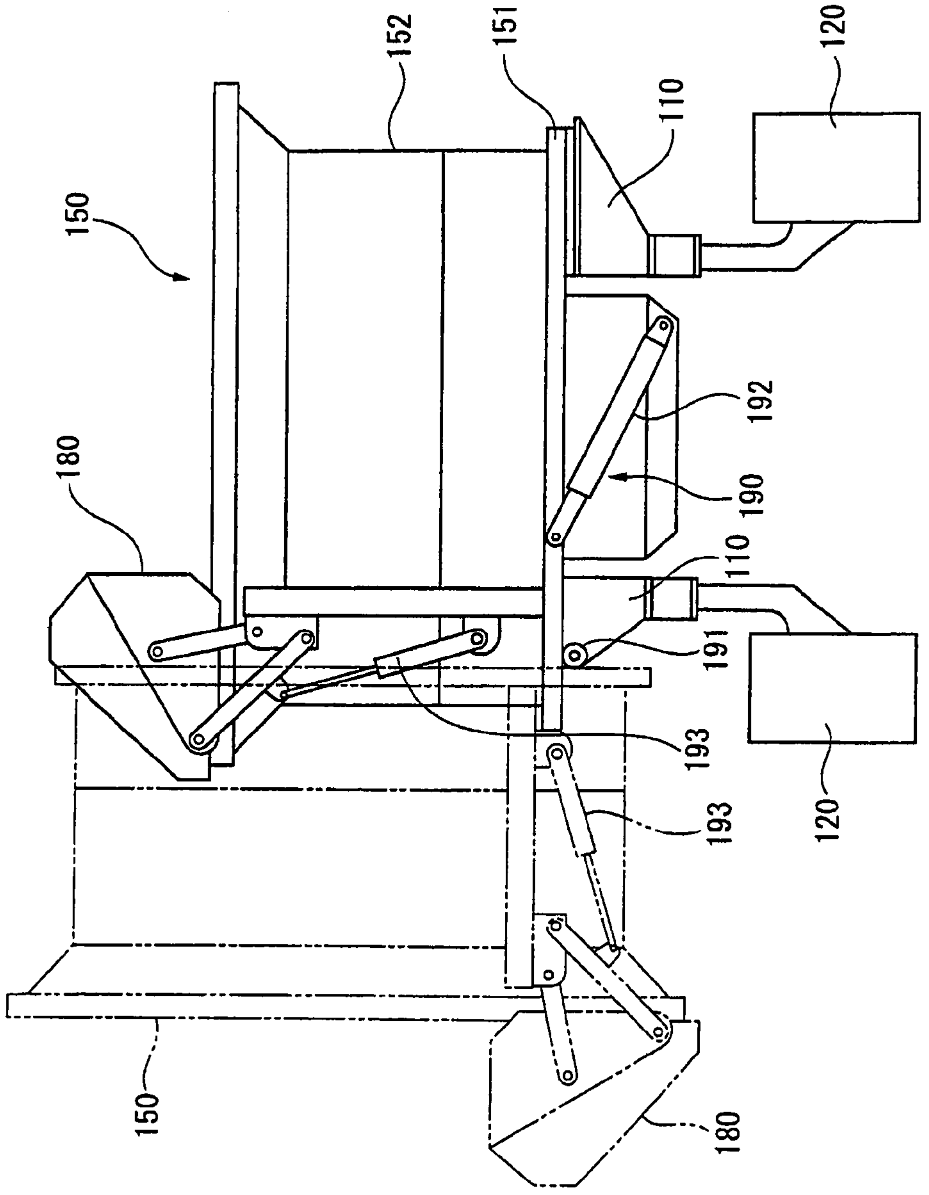
FIG. 41 Prior Art
FIG. 41 is a schematic view for illustrating actions of the swinging mechanism of the movable wood crushing machine based on the conventional technology.

The height F of the tab-type feeder 7 from the ground surface in the swinging posture is low, and therefore when the movable wood crushing machine 1 is mounted and transported on a trailer TR in the state where the scattering prevention cover 75 is closed and the tab-type feeder 7 is swung to the rear side of the vehicle body 2 as shown in FIG. 38, the entire height H of the vehicle can be suppressed to a value lower than the maximum value allowable under traffic control for transportation.

INDUSTRIAL AVAILABILITY

The present invention is applicable not only to the movable wood crushing machine having a crawler type travel device with a caterpillar, but also to a movable wood crushing machine having other types of traveling devices such as a tyre.

The invention claimed is:

1. A movable wood crushing machine for producing crushed wood chips by crushing charged wood, comprising:

a vehicle body provided with a travel device for traveling;

a rotary crushing device provided at a first end of the vehicle body in a traveling direction for crushing the wood into the wood chips;

a tub-type feeder having a rotary tub rotatably provided on the rotary crushing device with a charging opening for charging wood to be crushed formed on an upper part thereof, the feeder being arranged such that the charging opening is open toward the first end of the vehicle body in the traveling direction and obliquely to the traveling direction in a planar view;

a conveyer extending from a position under the rotary crushing device toward a second end of the vehicle body in the traveling direction, opposite the first end, for transferring and discharging the wood chips crushed by the rotary crushing device away from the vehicle body; and a drive unit provided between the rotary crushing device and the conveyer for driving drive sources for the travel device, the rotary crushing device, the tub-type feeder, and the conveyer;

wherein the rotary crushing device is provided at a position adjacent to the drive unit; and wherein the tub-type feeder has a scattering prevention cover provided at a position corresponding to the position of the rotary crushing device and which only partially covers the charging opening, and wherein the scattering prevention cover is arranged relative to the charging opening when the rotary crushing device crushes the wood into wood chips and the conveyer transfers the wood chips crushed by the rotary crushing device away from the vehicle body such that a part of the charging opening not covered by the scattering prevention cover opens in a direction opposite to an extending and crushed wood chip transfer and discharge direction of the conveyer and any wood chips that are discharged from the uncovered part of the charging opening do not fall onto the conveyer.

2. The movable wood crushing machine according to claim 1, wherein an opening for feeding wood to the rotary crushing device is formed at bottom section of the tub type feeder; and the scattering prevention cover is provided at a position covering the opening when viewed from the top.

3. The movable wood crushing machine according to claim 2, wherein the scattering prevention cover extends from an edge section of the charging opening of the tub-type feeder on the side closer to the drive unit in the traveling direction toward an edge section in a lateral direction perpendicular to the traveling direction.

4. The movable wood crushing machine according to claim 3, wherein an operation panel for driving and operating various devices including the drive unit is provided on a side face in the lateral direction perpendicular to the traveling direction of the vehicle body;

a cooling air inlet section for the drive unit is formed on the side face with the operation panel provided thereon; and the cooling air inlet section is covered with a covering device allowing visual check of clogging on the surface thereof.

5. The movable wood crushing machine according to claim 2, wherein an operation panel for driving and operating various devices including the drive unit is provided on a side face in a lateral direction perpendicular to the traveling direction of the vehicle body;

a cooling air inlet section for the drive unit is formed on the side face with the operation panel provided thereon; and the cooling air inlet section is covered with a covering device allowing visual check of clogging on the surface thereof.

6. The movable wood crushing machine according to claim 2, wherein the vehicle body is provided with a swinging mechanism for swinging the tub-type feeder toward the first end of the vehicle body in the traveling direction.

7. The movable wood crushing machine according to claim 6, wherein the swinging mechanism has a coupling shaft swingably bearing the tub-type feeder on the vehicle body; and when the tub-type feeder is in a posture for working, the horizontal distance from the center of the coupling shaft to an edge section of the tub-type feeder on the side closer to the drive unit along the traveling direction of the vehicle body is shorter than the vertical distance from the center of the coupling shaft to the highest part of the tub-type feeder.

8. The movable wood crushing machine according to claim 7, wherein when the tub-type feeder is in a posture for working, the horizontal distance from the center of the coupling shaft to an edge section of the tub-type feeder on the contrary side from the drive unit along the traveling direction of the vehicle body is shorter than the vertical direction from the center of the coupling shaft to a position of the travel device contacting the ground surface.

9. The wood crushing machine according to claim 2, wherein a screen member allowing passing through only the wood chips crushed by the rotary crushing device having a prespecified size or below is provided between the rotary crushing device and the conveyer; and the screen member is provided around a rotary shaft of the rotary crushing device to surround the rotary crushing device with an upper edge thereof provided at a position higher than the rotary shaft of the rotary crushing device when viewed from a position of the rotary shaft.

10. The movable wood crushing machine according to claim 1, wherein the scattering prevention cover extends from an edge section of the charging opening of the tub-type feeder on the side closer to the drive unit in the traveling direction toward an edge section in a lateral direction perpendicular to the traveling direction.

11. The movable wood crushing machine according to claim 10, wherein an operation panel for driving and operating various devices including the drive unit is provided on a side face in the lateral direction perpendicular to the traveling direction of the vehicle body;

a cooling air inlet section for the drive unit is formed on the side face with the operation panel provided thereon; and the cooling air inlet section is covered with a covering device allowing visual check of clogging on the surface thereof.

12. The movable wood crushing machine according to claim 1, wherein an operation panel for driving and operating various devices including the drive unit is provided on a side face in a lateral direction perpendicular to the traveling direction of the vehicle body;

a cooling air inlet section for the drive unit is formed on the side face with the operation panel provided thereon; and the cooling air inlet section is covered with a covering device allowing visual check of clogging on the surface thereof.

13. The movable wood crushing machine according to claim 12, wherein the tub-type feeder comprises:

a base plate fixed on the vehicle body;

a rotary tub rotatably provided on the base plate; and a hopper provided in the upper part of the rotary tub and supported by a column erected from the base plate.

14. The movable wood crushing machine according to claim 13, wherein the swinging mechanism has a swinging restricting section for inhibiting a swinging movement of the tub-type feeder up to a position causing interference to the travel device when the tub-type feeder is swung around the coupling shaft.

15. The movable wood crushing machine according to claim 1, wherein the vehicle body is provided with a swinging mechanism for swinging the tub-type feeder toward the first end of the vehicle body in the traveling direction.

16. The movable wood crushing machine according to claim 15, wherein the swinging mechanism has a coupling shaft swingably bearing the tub-type feeder on the vehicle body; and when the tub-type feeder is in a posture for working, the horizontal distance from the center of the coupling shaft to an edge section of the tub-type feeder on the side closer to the drive unit along the traveling direction of the vehicle body is shorter than the vertical distance from the center of the coupling shaft to the highest part of the tub-type feeder.

17. The movable wood crushing machine according to claim 16, wherein the tub-type feeder comprises:

a base plate fixed on the vehicle body;

a rotary tub rotatably provided on the base plate; and a hopper provided in the upper part of the rotary tub and supported by a column erected from the base plate.

18. The movable wood crushing machine according to claim 16, wherein the swinging mechanism has a swinging restricting section for inhibiting a swinging movement of the tub-type feeder up to a position causing interference to said travel device when the tub-type feeder is swung around the coupling shaft.

19. The movable wood crushing machine according to claim 16, wherein when the tub-type feeder is in a posture for working, the horizontal distance from the center of the coupling shaft to an edge section of the tub-type feeder on the contrary side from the drive unit along the traveling direction of the vehicle body is shorter than the vertical direction from the center of the coupling shaft to a position of the travel device contacting the ground surface.

20. The movable wood crushing machine according to claim 19, wherein the swinging mechanism has a swinging restricting section for inhibiting a swinging movement of the tub-type feeder up to a position causing interference to the travel device when the tub-type feeder is swung around the coupling shaft.

21. The movable wood crushing machine according to claim 15, wherein the swinging mechanism has a swinging restricting section for inhibiting a swinging movement of the tub-type feeder up to a position causing interference to the travel device when the tub-type feeder is swung around the coupling shaft.

22. The movable wood crushing machine according to claim 15, wherein the tub-type feeder comprises:

a base plate fixed on the vehicle body;

a rotary tub rotatably provided on the base plate; and a hopper provided in the upper part of the rotary tub and supported by a column erected from the base plate.

23. The wood crushing machine according to claim 1, wherein a screen member allowing passing through only the wood chips crushed by the rotary crushing device having a prespecified size or below is provided between the rotary crushing device and the conveyer; and the screen member is provided around a rotary shaft of the rotary crushing device to surround the rotary crushing device with an upper edge thereof provided at a position higher than the rotary shaft of the rotary crushing device when viewed from a position of the rotary shaft.

* * * * *